United States Patent
Zhao et al.

(10) Patent No.: US 10,641,608 B2
(45) Date of Patent: May 5, 2020

(54) METHOD AND SYSTEM FOR REAL-TIME POSITIONING OF SMART DEVICE, AND METHOD FOR DETERMINING THE MOTION GESTURE OF MOBILE PHONE

(71) Applicant: GUANGZHOU HKUST FOK YING TUNG RESEARCH INSTITUTE, Guangzhou, Guangdong (CN)

(72) Inventors: Ran Zhao, Guangdong (CN); Tao Zhang, Guangdong (CN); Zhouhong Wang, Guangdong (CN); Min Gao, Guangdong (CN)

(73) Assignee: GUANGZHOU HKUST FOK YING TUNG RESEARCH INSTITUTE, Guangzhou (CN)

( * ) Notice: Subject to any disclaimer, the term of this patent is extended or adjusted under 35 U.S.C. 154(b) by 560 days.

(21) Appl. No.: 15/504,025

(22) PCT Filed: Feb. 16, 2016

(86) PCT No.: PCT/CN2016/073895
§ 371 (c)(1),
(2) Date: Feb. 15, 2017

(87) PCT Pub. No.: WO2017/000563
PCT Pub. Date: Jan. 5, 2017

(65) Prior Publication Data
US 2017/0234686 A1 Aug. 17, 2017

(30) Foreign Application Priority Data
Jun. 30, 2015 (CN) .......................... 2015 1 0376966
Jan. 26, 2016 (CN) .......................... 2016 1 0051156

(51) Int. Cl.
*G01C 21/16* (2006.01)
*G01P 15/18* (2013.01)
*G01C 22/00* (2006.01)

(52) U.S. Cl.
CPC ........... *G01C 21/16* (2013.01); *G01C 22/006* (2013.01); *G01P 15/18* (2013.01)

(58) Field of Classification Search
CPC ........ G01C 21/16; G01C 21/10; G01C 21/12; G01C 22/006; G01P 15/18
See application file for complete search history.

(56) References Cited

U.S. PATENT DOCUMENTS

| 2010/0214216 | A1* | 8/2010 | Nasiri | ..................... A63F 13/06 345/158 |
| 2011/0307213 | A1* | 12/2011 | Zhao | ..................... G01C 17/30 702/153 |
| 2013/0158941 | A1* | 6/2013 | Yang | ..................... G01C 21/10 702/141 |

FOREIGN PATENT DOCUMENTS

CN            102944240 A            2/2013

OTHER PUBLICATIONS

International Search Report of PCT Patent Application No. PCT/CN2016/073895 dated May 5, 2016.

* cited by examiner

Primary Examiner — Manuel L Barbee

(57) ABSTRACT

The present invention discloses a method for real-time positioning of a smart device, comprising: getting tri-axial acceleration sequences truncated in turn by using a preset time period in the world coordinate individually; acquiring a dominate frequency $f_{step}$ by applying fast Fourier transform (FFT) on the truncated Z-axis acceleration sequence, using a band-pass filter with a pass band [$f_{step}$−0.5 Hz, $f_{step}$+0.5 Hz] to filter the truncated tri axial acceleration sequences individually; comparing the time domain waveform form from the filtered Z-axis acceleration sequence with a preset step threshold, and counting each peak above the threshold as a step to acquire a user's step number in the present time period; determining the moving direction of the smart device in the time period by calculating the filtered X-axis and Y-axis acceleration sequences; determining the current position of the smart device by calculating the user's step number and the moving direction of the smart device.

11 Claims, 12 Drawing Sheets

METHOD AND SYSTEM FOR REAL-TIME POSITIONING OF SMART DEVICE, AND METHOD FOR DETERMINING THE MOTION GESTURE OF MOBILE PHONE

FIELD OF THE INVENTION

The invention relates to real-time positioning technology, in particular, to a method and a system for real-time positioning of a smart device, and a method for determining the motion gesture of a mobile phone.

BACKGROUND OF THE INVENTION

Nowadays, portable smart devices are increasingly popular and necessary to modern people's daily life. With the upgrading of manufacturing technology of smart devices, various Micro-electromechanical System (MEMS) sensors are integrated in portable smart devices. Thus, many techniques for pedestrian navigation and tracking are developed using portable smart devices.

In one method Dead Reckoning and Zero Velocity Update (ZUPT) is utilized to achieve the goals. This method gets the velocity and moving direction of a smart device by integrating the acceleration data from its accelerometer, and then estimates the current position of the smart device. The ZUPT technology is used during the process to reduce the cumulative error. However, the accuracy of MEMS sensors in smart devices is relatively low, and the integral of acceleration data will lead to significant cumulative error. Even though the ZUPT technology is applied to reduce the cumulative error, the improvement of accuracy is limited because of the randomness and complexity of human motion.

In another method, the moving direction of the smart device is determined by a moving orientation of the smart device. Wherein one of the three axes, normally y-axis, of a smart device is required to point to the moving direction during user's walking, and the moving direction of the smart device is calculated by combining the gravitational acceleration and orientation of the magnetic field. The displacement data of the smart device can be obtained and the real-time positioning result can be indicated by combining the step counting algorithm. Nevertheless, its usage should satisfy some requirement in this method, otherwise, if the user does not hold the device in a pre-defined orientation, considerable error would be introduced to the positioning result.

Still another particular method analyzes users' gait according to the waveforms of acceleration values recorded by the acceleration in smart devices. An instant acceleration is detected in the deceleration phase, and its projection on the horizontal plane determines the moving direction. The method avoids the cumulative error, but it is not universally applicable due to the randomness and complexity of human motions.

SUMMARY OF THE INVENTION

Embodiment of the present invention aims to provide a method and a system for real-time positioning of a smart device, which can promote positioning accuracy greatly.

In order to realize the aim mentioned above, embodiments of the present invention provide a method for real-time positioning of a smart device, comprising the following steps:

S1: getting tri-axial acceleration in the world coordinate during motion of a smart device by calculating real-time data acquired by an accelerometer, a gravity accelerometer and a magnetic field sensor built in the smart device;

S2: getting tri-axial acceleration sequences truncated in turn by using a preset time period in the world coordinate individually; wherein the preset time period includes 6-8 step periods, and the step period is average step length of a user carrying the smart device;

S3: getting a dominate frequency $f_{step}$ by applying fast Fourier transform (FFT) on the truncated Z-axis acceleration sequence, using a band-pass filter with a pass band [$f_{step}$−0.5 Hz, $f_{step}$+0.5 Hz] to filter the truncated tri-axial acceleration sequences individually;

S4: comparing the time domain waveform form from the filtered Z-axis acceleration sequence with a preset step threshold, and counting each peak above the threshold as a step to acquire a user's step number in the present time period;

S5: determining the moving direction of the smart device in the present time period by implementing the Principal Component Analysis on the filtered X-axis acceleration sequence and Y-axis acceleration sequence;

S6: calculating displacement of the smart device in the present time period according to formula (1), determining the current position of the smart device by combining the displacement and a previous position recorded in last time period, and recording the current position:

$$S = N * d * V_{move};  \quad \text{Formula (1)}$$

where S denotes the displacement of the smart device in the present time period, N denotes the step number of user in the present time period, $V_{move}$ denotes the moving direction of the smart device of in the present time period, and d denotes the average step length of the user.

Preferably, the method further comprises:

S7: getting a trajectory of the smart device by connecting the current position determined in S6 with the previous position recorded in last time period, and then displaying the trajectory of the smart device.

Preferably, the method further comprises:

S41: if the time domain waveform form from the filtered Z-axis acceleration sequence includes M pairs of adjacent peaks exceeding the preset step threshold, and an interval between the adjacent peaks is less than a preset shortest step interval, then the user's step number minus M, wherein M≥1.

Preferably, the preset shortest step interval is 0.5 second.

Preferably, the preset step threshold is 0.5 m/s².

Preferably, the preset time period is 4 seconds; and/or the sampling frequency of the accelerometer is 50 Hz.

Preferably, the step S1 further comprises:

S11: getting a rotation matrix from the device coordinate to the world coordinate according to the real-time data in the device coordinate acquired by the gravity accelerometer and the magnetic field sensor;

S12: multiplying the tri-axial acceleration in the device coordinate acquired by the accelerometer in real time by the rotation matrix to get the tri-axial acceleration in the world coordinate.

Preferably, the rotation matrix R is as follows:

$$R = \begin{bmatrix} \cos\gamma \cdot \cos\varphi - \sin\gamma \cdot \sin\theta \cdot \sin\varphi & \cos\gamma \cdot \sin\theta + \sin\gamma \cdot \sin\theta \cdot \cos\varphi & -\sin\gamma \cdot \cos\theta \\ -\cos\theta \cdot \sin\varphi & \cos\theta \cdot \cos\varphi & \sin\theta \\ \sin\gamma \cdot \cos\varphi + \cos\gamma \cdot \sin\theta \cdot \sin\varphi & \sin\gamma \cdot \sin\varphi - \cos\gamma \cdot \sin\theta \cdot \cos\varphi & \cos\gamma \cdot \cos\theta \end{bmatrix}$$

where R denotes the rotation matrix; φ, θ and γ denote azimuth, pitch and roll respectively, and the relation thereamong is shown by the following formula (2):

$$\begin{cases} \theta = \sin^{-1}\dfrac{G_y}{g} \\ \gamma = \tan^{-1}\left(-\dfrac{G_x}{G_z}\right) \\ \varphi = \tan^{-1}\dfrac{\cos\gamma \cdot B_x + \sin\gamma \cdot B_y}{\sin\theta \cdot \sin\gamma \cdot B_x + \cos\theta \cdot B_y - \sin\theta \cdot \cos\gamma \cdot B_z} \end{cases} \quad \text{Formula (2)}$$

where $G_x$, $G_y$, $G_z$ respectively denote the tri-axial gravitational acceleration in the device coordinate acquired by the gravity accelerometer in real time while $B_x$, $B_y$, $B_z$ respectively denote the tri-axial magnetic flux in the device coordinate acquired by the magnetic sensor in real time.

Preferably, the step S5 further comprises:

S51: combining the X-axis acceleration sequence and Y-axis acceleration sequence to form a horizontal acceleration matrix;

S52: obtaining a first principal component vector of the horizontal acceleration matrix by implementing Principal Component Analysis;

S53: getting a horizontal acceleration sequence by implementing dimension reduction of the horizontal acceleration matrix on the first principal component vector;

S54: calibrating the first principal component vector according to the phase difference between the horizontal acceleration sequence and the filtered Z-axis acceleration sequence to obtain the moving direction of the smart device.

Preferably, the step S52 further comprises:

S521, calculating a covariance matrix of the horizontal acceleration matrix according to the formula (3):

$$C = E\{(X - E[X])(X - E[X])^T\}; \quad \text{Formula (3)}$$

where X denotes the horizontal acceleration matrix, and C denotes the covariance matrix;

S522, calculating an eigenvector v of the covariance matrix C and a corresponding eigenvalue λ according to the formula (4):

$$Cv = \lambda v \quad \text{Formula (4)}$$

wherein the eigenvector corresponding to the maximum eigenvalue is the first principal component eigenvector.

Preferably, the step S53 further comprises:

multiplying the horizontal acceleration matrix by the first principal component eigenvector to get the dimension reduced horizontal acceleration sequence.

Preferably, the step S54 further comprises:

comparing the horizontal acceleration sequence with the filtered Z-axis acceleration sequence, if the filtered Z-axis acceleration sequence has a leading-phase compared to the horizontal acceleration sequence, the moving direction of the smart device is the same as the first principal component vector; otherwise, if the horizontal acceleration sequence has a leading-phase compared to the filtered Z-axis acceleration sequence, the moving direction of the smart device is opposite to the first principal component vector.

Embodiment of the present invention also provides a system for real-time positioning of a smart device correspondingly, comprising:

a tri-axial acceleration calculating module, configured for getting tri-axial acceleration in the world coordinate during motion of a smart device by calculating real-time data acquired by an accelerometer, a gravity accelerometer and a magnetic field sensor built in the smart device;

a tri-axial acceleration sequences truncation module, configured for getting tri-axial acceleration sequences truncated by using a preset time period in the world coordinate individually; wherein the preset time period includes 6-8 step periods, and the step period is average step length of a user carrying the smart device;

a filtering module, configured for getting a dominate frequency $f_{step}$ by applying fast Fourier transform (FFT) on the truncated Z-axis acceleration sequence, using a bandpass filter with a pass band [$f_{step}$−0.5 Hz, $f_{step}$+0.5 Hz] to filter the truncated tri-axial acceleration sequences individually;

a step counting module, configured for comparing the time domain waveform form from the filtered Z-axis acceleration sequence with a preset step threshold, and counting each peak above the threshold as a step to acquire a user's step number in the present time period;

a moving direction calculating module, configured for determining the moving direction of the smart device in the present time period by implementing the Principal Component Analysis on the filtered X-axis acceleration sequence and Y-axis acceleration sequence;

a position calculating and recording module, configured for calculating displacement of the smart device in the present time period according to formula (1), determining the current position of the smart device by combining the displacement and a previous position recorded in last time period, and recording the current position:

$$S = N * d * V_{move}; \quad \text{Formula (1)}$$

where S denotes the displacement of the smart device in the present time period, N denotes the step number of user in the present time period, $V_{move}$ denotes the moving direction of the smart device of in the present time period, and d denotes the average step length of the user.

Preferably, the system further comprises:

a trajectory displaying module, configured for getting a trajectory of the smart device by connecting the current position determined by the position calculating and recording module with the previous position recorded in last time period, and then display.

Preferably, the system further comprises:

a step number calibrating module, configured for implementing the following step: when the time domain waveform form from the filtered Z-axis acceleration sequence includes M pairs of adjacent peaks exceeding the preset step threshold, and an interval between the adjacent peaks is less than a preset shortest step interval, then the user's step number minus M, wherein M≥1.

Preferably, the preset shortest step interval is 0.5 second.

Preferably, the preset step threshold is 0.5 m/s².

Preferably, the preset time period is 4 seconds; and/or the sampling frequency of the accelerometer is 50 Hz.

Preferably, the tri-axial acceleration calculating module further comprises:

a rotation matrix calculating unit, configured for getting a rotation matrix from the device coordinate to the world coordinate according to the real-time data in the device coordinate acquired by the gravity accelerometer and the magnetic field sensor;

a tri-axial acceleration calculating unit, configured for multiplying the tri-axial acceleration in the device coordinate acquired by the accelerometer in real time by the rotation matrix to get the tri-axial acceleration in the world coordinate.

Preferably, the rotation matrix R is as follows:

$$R = \begin{bmatrix} \cos\gamma\cdot\cos\varphi - \sin\gamma\cdot\sin\theta\cdot\sin\varphi & \cos\gamma\cdot\sin\theta + \sin\gamma\cdot\sin\theta\cdot\cos\varphi & -\sin\gamma\cdot\cos\theta \\ -\cos\theta\cdot\sin\varphi & \cos\theta\cdot\cos\varphi & \sin\theta \\ \sin\gamma\cdot\cos\varphi + \cos\gamma\cdot\sin\theta\cdot\sin\varphi & \sin\gamma\cdot\sin\varphi - \cos\gamma\cdot\sin\theta\cdot\cos\varphi & \cos\gamma\cdot\cos\theta \end{bmatrix}$$

where the R denotes the rotation matrix; $\varphi$, $\theta$ and $\gamma$ denote azimuth, pitch and roll respectively, and the relation thereamong is shown by the following formula (2):

$$\begin{cases} \theta = \sin^{-1}\dfrac{G_y}{g} \\ \gamma = \tan^{-1}\left(-\dfrac{G_x}{G_z}\right) \\ \varphi = \tan^{-1}\dfrac{\cos\gamma\cdot B_x + \sin\gamma\cdot B_y}{\sin\theta\cdot\sin\gamma\cdot B_x + \cos\theta\cdot B_y - \sin\theta\cdot\cos\gamma\cdot B_z} \end{cases} \quad \text{Formula (2)}$$

where Gx, Gy, Gz respectively denote the tri-axial gravitational acceleration in the device coordinate acquired by the gravity accelerometer in real time while Bx, By, Bz respectively denote the tri-axial magnetic flux in the device coordinate acquired in real time by the magnetic sensor.

Preferably, the moving direction calculating module further comprises:

a horizontal acceleration matrix forming unit, configured for combining the X-axis acceleration sequence and Y-axis acceleration sequence to form a horizontal acceleration matrix;

a first principal component vector calculating unit, configured for obtaining a first principal component vector of the horizontal acceleration matrix by implementing Principal Component Analysis;

a horizontal acceleration sequence calculating unit, configured for getting a horizontal acceleration sequence by implementing dimension reduction of the horizontal acceleration matrix on the first principal component vector;

a moving direction calibrating unit, configured for calibrating the first principal component vector according to the phase difference between the horizontal acceleration sequence and the filtered Z-axis acceleration sequence to obtain the moving direction of the smart device.

Preferably, the first principal component vector calculating unit further comprises:

a covariance matrix calculating unit, configured for calculating a covariance matrix of the horizontal acceleration matrix according to the formula (3):

$$C = E\{(X - E[X])(X - E[X])^T\}; \quad \text{Formula (3)}$$

where X denotes the horizontal acceleration matrix, and C denotes the covariance matrix;

an eigenvector calculating unit, configured for calculating an eigenvector v of the covariance matrix C and a corresponding eigenvalue according to the formula (4):

$$Cv = \lambda v \quad \text{Formula (4)}$$

wherein the eigenvector corresponding to the maximum eigenvalue is the first principal component eigenvector.

Preferably, the horizontal acceleration sequence calculating unit is further configured for:

multiplying the horizontal acceleration matrix by the first principal component eigenvector to get the dimension reduced horizontal acceleration sequence.

Preferably, the moving direction calibrating unit is further configured for:

comparing the horizontal acceleration sequence with the filtered Z-axis acceleration sequence, if the filtered Z-axis acceleration sequence has a leading-phase compared to the horizontal acceleration sequence, the moving direction of the smart device is the same as the first principal component vector; otherwise, if the horizontal acceleration sequence has a leading-phase compared to the filtered Z-axis acceleration sequence, the moving direction of the smart device is opposite to the first principal component vector.

Compared to prior art, the method and system for real-time positioning of a smart device of the present invention truncates the tri-axial acceleration in the world coordinate within the preset time period (sliding window), which tri-axial acceleration is real-time acquired and calculated by the accelerometer, the gravity accelerometer and the magnetic field sensor in turn, and thus get tri-axial acceleration sequences truncated for the preset time period. Then a dominate frequency $f_{step}$ is obtained by applying fast Fourier transform (FFT) on the truncated Z-axis acceleration sequence, and the truncated tri-axial acceleration sequences are filtered by using a band-pass filter with a pass band $[f_{step}-0.5$ Hz, $f_{step}+0.5$ Hz] individually. Each peak in the time domain waveform, greater than the preset step threshold, is determined as one step, wherein the time domain waveform is formed by the filtered Z-axis acceleration sequence, and thus the user's step number in the present time period is obtained. The moving direction of the smart device in the present time period is determined by implementing the Principal Component Analysis (PCA) on the filtered X-axis acceleration sequence and Y-axis acceleration sequence, and the displacement and the current position of the smart device in the time period is determined by combination calculation of the user's step number and the moving direction of the smart device. In the present invention, the preset time period (sliding window) includes 6-8 step periods, and the preset time period ensures the accuracy of the determination of the dominate frequency of the Z-axis acceleration sequence by applying fast Fourier transform (FFT) in subsequent steps, as well as the timeliness of the step counting. Further, the present invention adopts a band-pass filter with a pass band $[f_{step}-0.5$ Hz, $f_{step}+0.5$ Hz], instead of a band-pass filter with a fixed pass band, to filter the tri-axial acceleration sequences for the time period individually, wherein the pass band $[f_{step}-0.5$ Hz, $f_{step}+0.5$ Hz] is designed according to the dominate frequency $f_{step}$ obtained by applying fast Fourier transform (FFT) to the Z-axis acceleration sequence for the time period (because the maximum amplitude of the acceleration data appears on the Z axis). Therefore, the pass band of the band-pass filter adopted by the present invention may automatically regulate itself according to the acquired Z-axis acceleration data, it is more effective to filter out the interference data compared with the existing band-pass filter with a fixed pass band. Furthermore, in order to avoid the erroneous determination induced by fluctuations of the acceleration data and peaks/troughs thereof due to slight waggle of the smart device in other states than walking, the present invention further incorporates a factor of step threshold, that is, each peak in the time domain waveform, greater than the preset step threshold, is determined as one step, wherein the time domain waveform is formed by the filtered Z-axis acceleration sequence, and thereby the accuracy of user's step counting is improved, so is the real-time positioning accuracy of the smart device.

Meanwhile, embodiments of the present invention also provide a method for determining the motion gesture of a mobile phone. The technical solution adopted by the present invention to solve the technical problem is as follows:

A method for determining the motion gesture of a mobile phone, comprising:

S1: getting the tri-axial acceleration in the world coordinate during motion of a mobile phone by calculating real-time data acquired by an accelerometer, a gravity accelerometer and a magnetic field sensor;

S2: using a band-pass filter to filter the real-time tri-axial acceleration, processing the acceleration in the horizontal direction and vertical direction individually, and then getting the walk direction vector of the mobile phone and counting step number;

S3: calculating a heading direction vector of the current step, and implementing dimension reduction of the horizontal acceleration on the direction vector;

S4: after calibrating the heading direction vector of the current step, calculating the current position of the mobile phone by combining the step number counting.

Further, the step S1 comprises:

S11: calculating a rotation matrix from the mobile phone coordinate to the world coordinate according to the real-time data in the mobile phone coordinate acquired by the gravity accelerometer and the magnetic field sensor;

S12: multiplying the tri-axial acceleration in the mobile phone coordinate acquired by the accelerometer in real time by the rotation matrix to get the tri-axial acceleration in the world coordinate during the motion of the mobile phone.

Further, the step S2 comprises:

S21: using a band-pass filter with a pass band of 1-3 Hz to filter the real-time tri-axial acceleration;

S22: implementing the Principal Component Analysis on the horizontal acceleration for the preset sliding window to get a walk direction vector of the mobile phone;

S23: counting step number according to the periodicity of the acceleration data in the vertical direction;

the preset sliding window is a time window having a duration of a step period.

Further, the step S22 further comprises:

after forming the horizontal acceleration matrix from the X-axis acceleration data and Y-axis acceleration data in a horizontal plane for the preset sliding window, calculating a covariance matrix of the above matrix, and thereby the eigenvector of the covariance matrix and the corresponding eigenvalue, and eventually the eigenvector corresponding to the maximum eigenvalue of the covariance matrix, which eigenvector acts as the walk direction vector of the mobile phone at present.

Further, the step S3 comprises:

S31: calculating a mean value of the walk direction vector in a step period as the heading direction vector of the current step;

S32: implementing dimension reduction of the horizontal acceleration on the heading direction vector.

Further, in the step S3, the step of implementing dimension reduction of the horizontal acceleration on the heading direction vector of the current step, further comprises:

forming the sampling matrix from the X-axis acceleration data and Y-axis acceleration data in a horizontal plane in the step period, and then multiplying the sampling matrix by the heading direction vector to get a product which acts as a dimension-reduced horizontal acceleration.

Further, the step S4 comprises:

S41: calculating a phase difference between the vertical acceleration and the dimension-reduced horizontal acceleration, and calibrating the heading direction vector of the current step according to the phase difference, so as to get the walk heading direction vector of the mobile phone;

S42: combining the walk heading direction vector and the step counting, so as to determine the current position of the mobile phone.

Further, the step S41 further comprises:

calculating a phase difference between the vertical acceleration and the dimension-reduced horizontal acceleration, and calibrating the heading direction vector of the current step according to the phase difference, if the phase of the vertical acceleration is ahead of the phase of the dimension-reduced horizontal acceleration, the heading direction vector acts as the walk heading direction vector, otherwise the inverse heading direction vector acts as the walk heading direction vector.

The step S42 further comprises:

combining the walk heading direction vector and the step counting according to the following formula, so as to determine the current position of the mobile phone:

$$\begin{cases} s_{current} = s_{initial} + \sum_{i=0}^{N} s_i \\ s_i = L_i \cdot v_{gi} \end{cases}$$

where $s_{current}$ denotes the current position of the mobile phone, $s_{initial}$ denotes the initial position of the mobile phone, N denotes the number of step counting, i denotes a natural number, $s_i$ denotes the displacement of the mobile phone during step i, $L_i$ denotes the length of the step i, $v_{gi}$ denotes the walk heading direction vector of the step i.

Further, the rotation matrix in the step S11 is:

$$R = \begin{bmatrix} \cos\gamma \cdot \cos\varphi - \sin\gamma \cdot \sin\theta \cdot \sin\varphi & \cos\gamma \cdot \sin\theta + \sin\gamma \cdot \sin\theta \cdot \cos\varphi & -\sin\gamma \cdot \cos\theta \\ -\cos\theta \cdot \sin\varphi & \cos\theta \cdot \cos\varphi & \sin\theta \\ \sin\gamma \cdot \cos\varphi + \cos\gamma \cdot \sin\theta \cdot \sin\varphi & \sin\gamma \cdot \sin\varphi - \cos\gamma \cdot \sin\theta \cdot \cos\varphi & \cos\gamma \cdot \cos\theta \end{bmatrix}$$

where R denotes the rotation matrix, $\varphi$、$\theta$、$\gamma$ denote azimuth, pitch and roll respectively. And they should match the following formula (2):

$$\begin{cases} \theta = \sin^{-1} \frac{G_y}{g} \\ \gamma = \tan^{-1}\left(-\frac{G_x}{G_z}\right) \\ \varphi = \tan^{-1} \frac{\cos\gamma \cdot B_x + \sin\gamma \cdot B_y}{\sin\theta \cdot \sin\gamma \cdot B_x + \cos\theta \cdot B_y - \sin\theta \cdot \cos\gamma \cdot B_z} \end{cases}$$

where g denotes the gravitational acceleration, $G_x$、$G_y$、$G_z$ respectively denote the tri-axial real-time data in the mobile phone coordinate acquired by the gravity accelerometer while $B_x$, $B_y$, $B_z$ respectively denote the tri-axial real-time data in the mobile phone coordinate acquired by the magnetic sensor.

The advantages of the present invention comprise that, a method for determining the motion gesture of a mobile phone, comprising S1: getting the tri-axial acceleration in the world coordinate during motion of a mobile phone by calculating real-time data acquired by an accelerometer, a gravity accelerometer and a magnetic field sensor; S2: using a band-pass filter to filter the real-time tri-axial acceleration, processing the acceleration in the horizontal direction and vertical direction individually, and then getting the walk direction vector of the mobile phone and counting step number; S3: calculating a heading direction vector of the current step, and implementing dimension reduction of the horizontal acceleration on the direction vector; S4: after calibrating the heading direction vector of the current step, calculating the current position of the mobile phone by combining the step number counting. This method determines the motion gesture of the mobile phone during user's walk by using the accelerometer, a gravity accelerometer and a magnetic field sensor built in the mobile phone, computes the motion gesture of the mobile phone during user's walk by processing and comparing the acceleration data of the mobile phone in the horizontal and vertical direction. This effectively avoids the cumulative error, improves the accuracy and the measurement stability. This method does not require the user to hold the mobile phone in a certain pose, and is well adapted to various users.

DETAILED DESCRIPTION OF ILLUSTRATED EMBODIMENT

Technical solutions of embodiment of the present invention are described clearly and completely below with reference to accompanying drawings. Obviously, the embodiment described is only part of, rather than all of the embodiments of the present invention. Any other embodiment acquired by a skilled person in this field without creative work over embodiment of the present invention shall be deemed as within the scope of the present invention.

Figure 1:
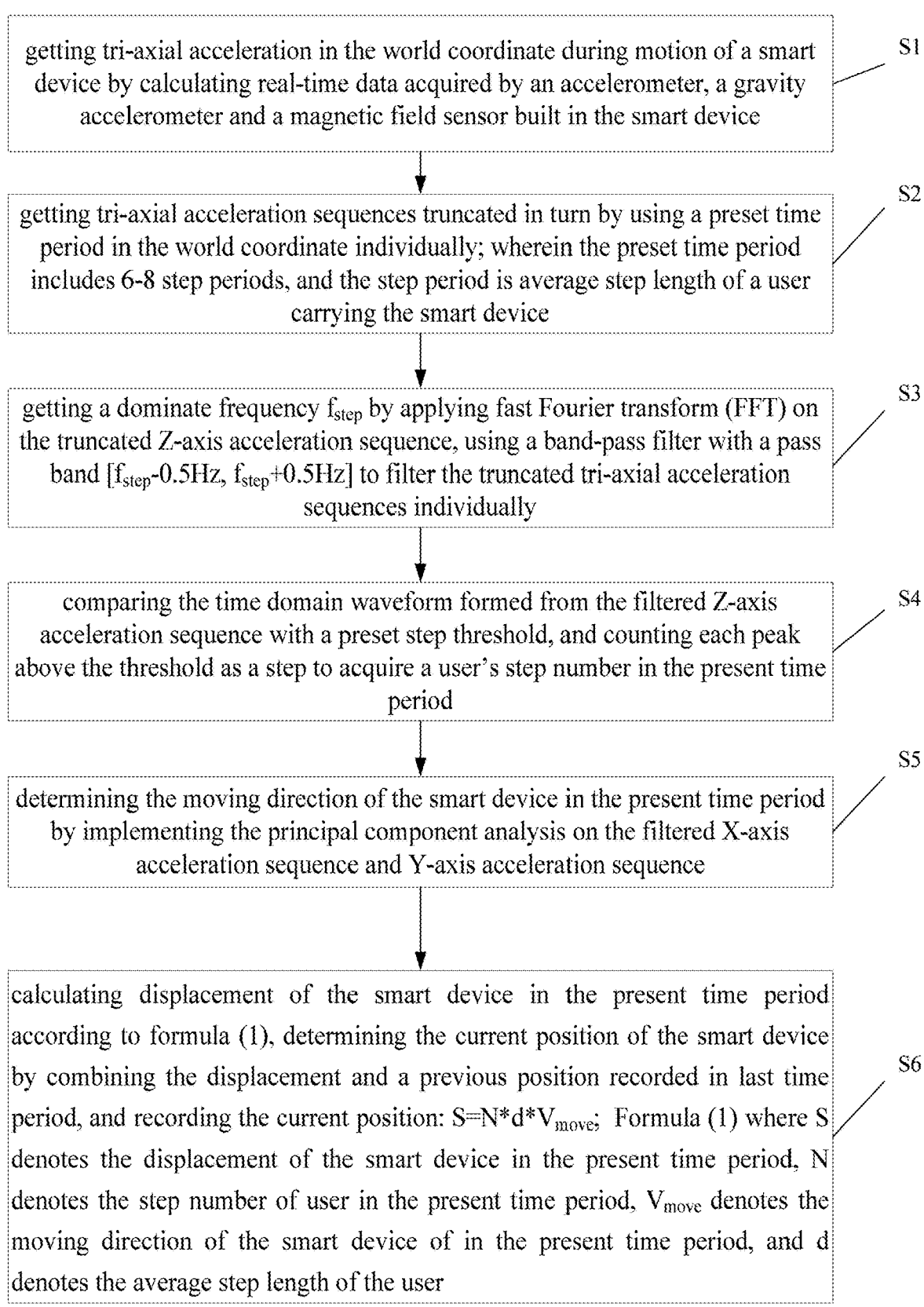
FIG. 1 is a flow diagram of a method of real-time positioning of a smart device according to embodiment 1 of the present invention.

Referred to FIG. 1, it shows a flow diagram of a method of real-time positioning of a smart device according to an embodiment of the present invention. This method comprises the steps of S1-S6:

S1: getting tri-axial acceleration in the world coordinate during motion of a smart device by calculating real-time data acquired by an accelerometer, a gravity accelerometer and a magnetic field sensor built in the smart device.

Figure 2:
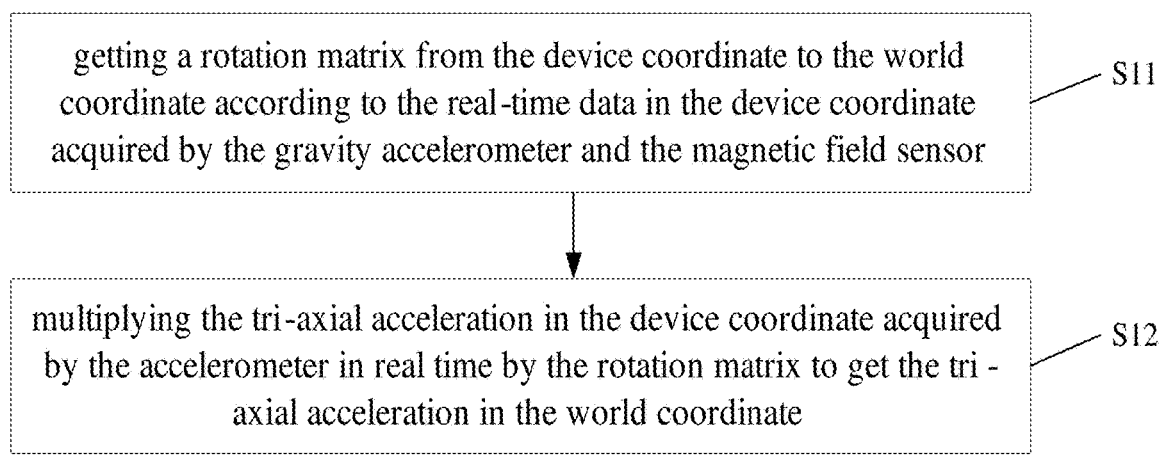
FIG. 2 is a flow diagram of the S1 in FIG. 1.

Wherein, as shown in FIG. 2, the step S1 further comprises the steps of S11-S12:

S11: calculating a rotation matrix from the device coordinate to the world coordinate according to the real-time data in the device coordinate acquired by the gravity accelerometer and the magnetic field sensor.

Figure 3:
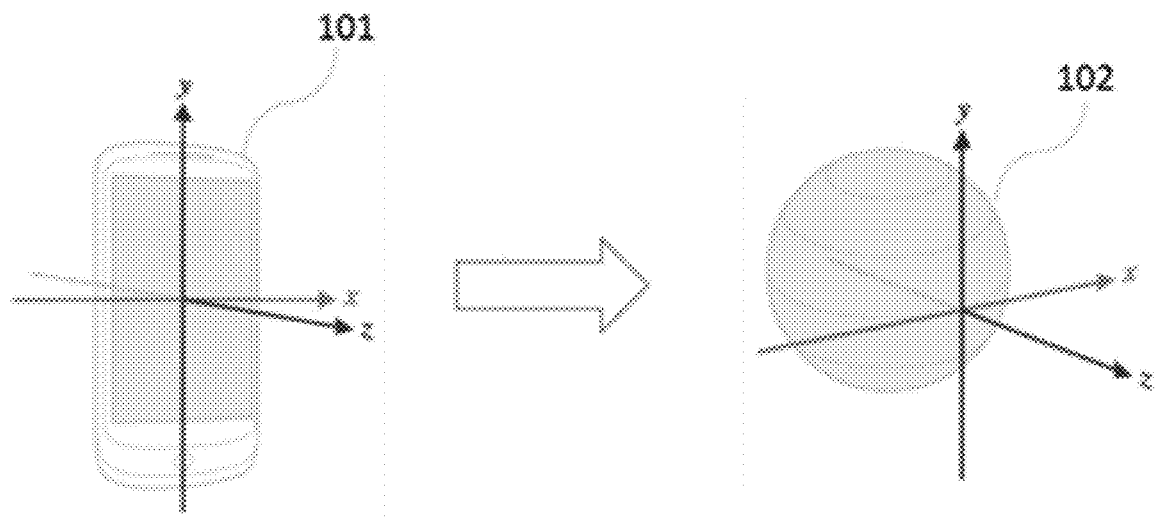
FIG. 3 is a three-dimensional diagram of the smart device rotating from the device coordinate to the world coordinate according to embodiment 1 of the present invention.

FIG. 3 is a three-dimensional view of the smart device rotating from the smart device coordinate to the world coordinate. The coordinate axes of the smart device coordinate system adopted by the accelerometer built in the smart device are determined as shown by 101 in FIG. 3, wherein the X-axis is parallel to the screen and pointing to the right, the Y-axis is parallel to the screen and pointing to the top, and the Z-axis is perpendicular to the screen and pointing outwards from the screen. In order to transform the acceleration data to the world coordinate, an upward direction perpendicular to the horizontal plane is determined by the gravity accelerometer at first, and then the North Pole in magnetic field is determined by the magnetic field sensor, next, the tri-axial acceleration values in the world coordinate are calculated. The coordinate axes in the world coordinate are defined as shown by 102 in FIG. 3, the X, Y, Z axes respectively point to the east, the north and the top.

Specifically, an upward direction perpendicular to the horizontal plane is determined by the gravitational acceleration, and the direction towards North Pole in magnetic field is determined by the magnetic flux. The azimuth φ, pitch θ and roll γ can be calculated based on the above two directions, and the three-dimensional rotation matrix R can be obtained by the following formula:

$$R = \begin{bmatrix} \cos\gamma\cdot\cos\varphi - \sin\gamma\cdot\sin\theta\cdot\sin\varphi & \cos\gamma\cdot\sin\theta + \sin\gamma\cdot\sin\theta\cdot\cos\varphi & -\sin\gamma\cdot\cos\theta \\ -\cos\theta\cdot\sin\varphi & \cos\theta\cdot\cos\varphi & \sin\theta \\ \sin\gamma\cdot\cos\varphi + \cos\gamma\cdot\sin\theta\cdot\sin\varphi & \sin\gamma\cdot\sin\varphi - \cos\gamma\cdot\sin\theta\cdot\cos\varphi & \cos\gamma\cdot\cos\theta \end{bmatrix}$$

where R denotes the rotation matrix; φ, θ and γ denote azimuth, pitch and roll respectively, and they should match the following formula (2):

$$\begin{cases} \theta = \sin^{-1}\dfrac{G_y}{g} \\ \gamma = \tan^{-1}\left(-\dfrac{G_x}{G_z}\right) \\ \varphi = \tan^{-1}\dfrac{\cos\gamma \cdot B_x + \sin\gamma \cdot B_y}{\sin\theta \cdot \sin\gamma \cdot B_x + \cos\theta \cdot B_y - \sin\theta \cdot \cos\gamma \cdot B_z} \end{cases} \quad \text{Formula (2)}$$

where $G_x$, $G_y$, $G_z$ respectively denote the tri-axial gravitational acceleration in the device coordinate acquired by the gravity accelerometer in real time while $B_x$, $B_y$, $B_z$ respectively denote the tri-axial magnetic flux in the device coordinate acquired in real time by the magnetic sensor. R can be calculated by plugging φ, θ and γ obtained by the formula (2) into the formula of the rotation matrix individually.

S12: multiplying the tri-axial acceleration in the device coordinate acquired by the accelerometer in real time by the rotation matrix to get the tri-axial acceleration in the world coordinate.

Wherein, it is assumed that the tri-axial acceleration in the device coordinate acquired by the accelerometer in real time are:

$$acc = \begin{bmatrix} acc_x \\ acc_y \\ acc_z \end{bmatrix}$$

After multiplying the tri-axial acceleration in the device coordinate acquired by the accelerometer in real time by the rotation matrix, the calculated tri-axial acceleration in the world coordinate during motion of the smart device is:

$$ACC = \begin{bmatrix} ACC_x \\ ACC_y \\ ACC_z \end{bmatrix}$$

where $ACC_x$ denotes the X-axis acceleration in the world coordinate, $ACC_y$ denotes the Y-axis acceleration in the world coordinate, that is, $ACC_x$ and $ACC_y$ are horizontal acceleration in the world coordinate; also, $ACC_z$ denotes the Z-axis acceleration in the world coordinate, i.e. vertical acceleration in the world coordinate.

S2: getting tri-axial acceleration sequences truncated in turn by using a preset time period in the world coordinate individually; wherein the preset time period includes 6-8 step periods, and the step period is average step length of a user carrying the smart device.

Extensive tests show that, the general frequency of human walk is about 1.5-2 Hz. The time period (i.e. the sliding window) in the present invention is set to 4 seconds. If the acquiring frequency of the accelerometer in the present invention is 50 Hz, then the length L of the sliding window should be 200. The sliding window with such length may comprises 6-8 step periods, and each step period is average step length of the user carrying the smart device, i.e. the time of each average step. The determination of the length L of the sliding window, provides an improved accuracy of determination of the dominate frequency by applying fast Fourier transform (FFT) in subsequent steps, and insures the real-time capability of the step counting. While implementing, an empty array having a length of 600 (the tri-axial acceleration, and the length of the sliding window is 200) may be provided, which array may be filled by the data acquired by the accelerometer and transformed to desired coordinate in an order of X-, Y- and Z-axes. The filled array will be processed subsequently, and meanwhile another empty array may be provided for next data recording.

S3: getting a dominate frequency $f_{step}$ by applying fast Fourier transform (FFT) on the truncated Z-axis acceleration sequence, using a band-pass filter with a pass band $[f_{step}-0.5$ Hz, $f_{step}+0.5$ Hz] to filter the truncated tri-axial acceleration sequences individually.

After getting tri-axial acceleration sequences for the present time period by truncating the tri-axial acceleration in the world coordinate using the sliding window having a duration of L individually, it is necessary to subsequently process the tri-axial acceleration sequences for the present time period. Firstly, the tri-axial acceleration sequences for the present time period are filtered.

Figure 4:
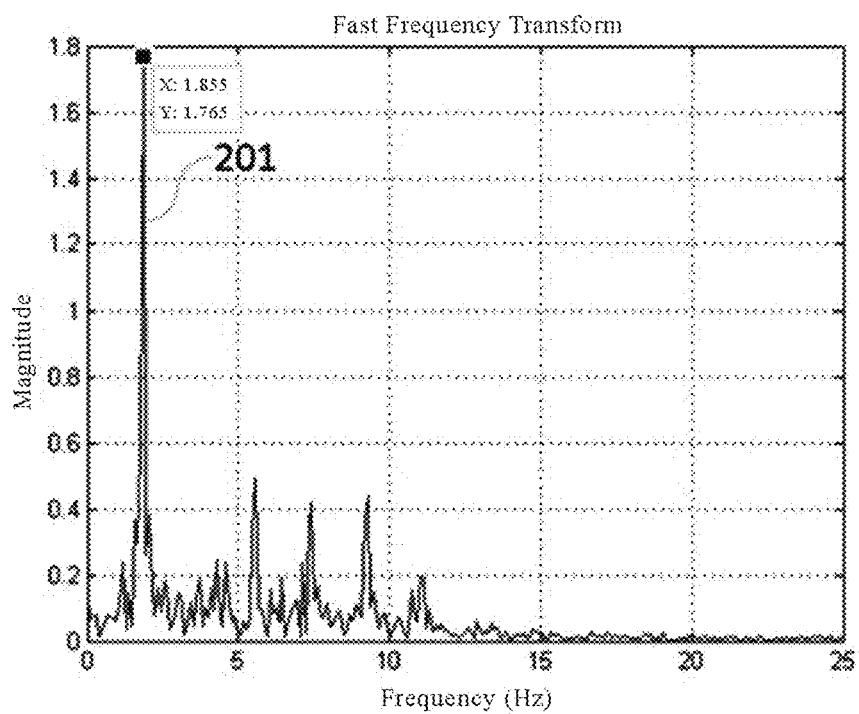
FIG. 4 is a frequency domain diagram of the Z-axis acceleration sequence truncated for the present time period according to embodiment 1 of the present invention.

As the maximum amplitude of the acceleration data appears on the Z axis, the Z-axis acceleration sequence for the present time period is extracted from said filled array and applied fast Fourier transform (FFT) thereto. As shown in FIG. 4, the amplitude at the step frequency in the obtained frequency response diagram is obviously greater than those at other frequencies. The frequency amplitude at 1.855 Hz is obviously greater than those at other frequencies, thus the step frequency (i.e. the dominate frequency $f_{step}$) acquired in that array is determined as 1.855 Hz. The acquired step frequency amplitude is used for the filter design. After the dominate frequency is detected, A band-pass filter with a pass band of $[f_{step}-0.5$ Hz, $f_{step}+0.5$ Hz] is designed to filter the tri-axial acceleration sequences for the present time period. The present invention adopts the IIR filter with a low delay, but the FIR filter with a higher stability is also suitable. As filtering may result in phase delay, then the time consistence of the filtered data can be insured by adopting an identical filter to filter the tri-axial acceleration sequences for the present time period.

After filtering the tri-axial acceleration sequences for the present time period with the band-pass filter provided by the present invention, the filtered tri-axial acceleration sequences for the present time period are:

$$fACC = \begin{bmatrix} fACC_x \\ fACC_y \\ fACC_z \end{bmatrix}$$

where $fACC_x$ denotes the filtered X-axis acceleration sequence for the present time period, $fACC_y$ denotes the filtered Y-axis acceleration sequence for the present time period, that is, $fACC_x$ and $fACC_y$ are filtered horizontal acceleration sequences for the present time period; also, $fACC_z$ denotes the filtered Z-axis acceleration sequence for the present time period, i.e. filtered vertical acceleration sequence for the present time period (vertical acceleration sequence).

S4: comparing the time domain waveform form from the filtered Z-axis acceleration sequence with a preset step threshold, and counting each peak above the threshold as a step to acquire a user's step number in present time period.

Figure 5:
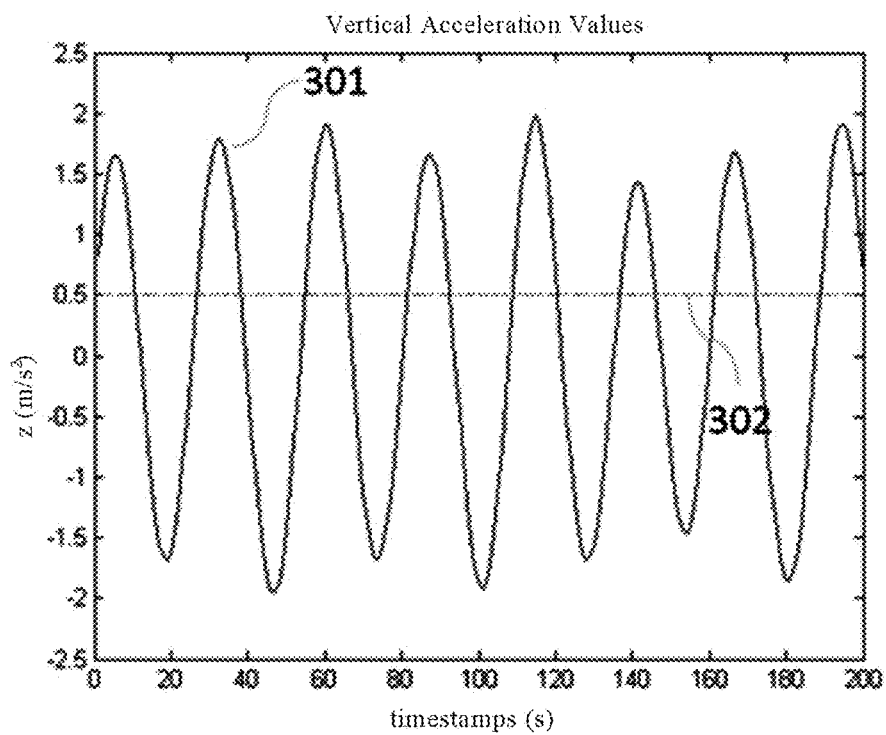
FIG. 5 is a time domain view of the filtered Z-axis acceleration sequence according to embodiment 1 of the present invention, and it shows a preset step threshold according to embodiment 1 of the present invention.

The filtered Z-axis acceleration sequence $fACC_z$ is the vertical acceleration sequence $ACC_V$, and then detecting and recording user's step number based on the preset step threshold. This embodiment provides a band-pass filter on basis of the step frequency to filter environmental noise in the original acceleration data. The waveform of the filtered vertical acceleration sequence $ACC_V$ is similar to the waveform of sinusoid wave. User's step number may be detected by estimating the periodicity of the waveform and with reference to the step threshold. As shown in FIG. 5, with the waveform 301 of the filtered vertical acceleration sequence is relatively smooth, which reduces erroneous judgment of the steps greatly. However, in order to exclude the erroneous determinations induced by fluctuations and peaks/troughs therebetween of the acceleration data caused by slight waggle of the smart device in other states than walking, the present invention further incorporates a factor of step threshold. In the time domain waveform of the filtered Z-axis acceleration sequence, only a peak beyond the step threshold 302 can be confirmed as one step, and thereby user's step number N for the present time period is obtained.

In this embodiment, the preset step threshold is 0.5 m/s².

S5: determining the moving direction of the smart device in the present time period by implementing the Principal Component Analysis on the filtered X-axis acceleration sequence and Y-axis acceleration sequence.

Figure 6:
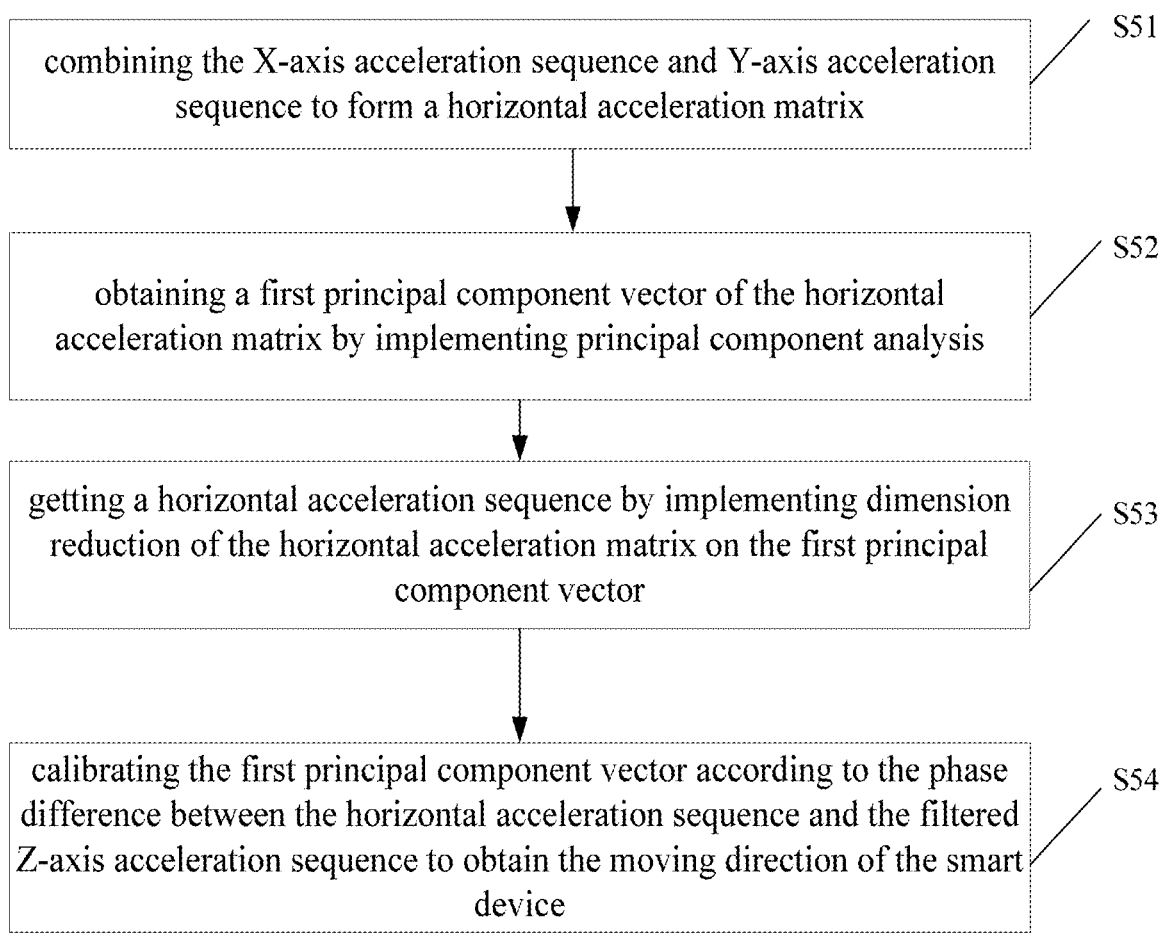
FIG. 6 is a flow diagram of the S5 in FIG. 1.

Specifically, as shown in FIG. 6, the step S5 further comprises the steps S51-S54:

S51: combining the filtered X-axis acceleration sequence and Y-axis acceleration sequence to form a horizontal acceleration matrix;

wherein, as the sliding window has a length of L, then the truncated and filtered X-axis acceleration sequence and Y-axis acceleration sequence $fACC_x$ and $fACC_y$ both have a length of L. Forming a matrix of L*2 by these two sequences, which matrix is marked as the horizontal acceleration matrix X.

S52: obtaining a first principal component vector of the horizontal acceleration matrix by implementing Principal Component Analysis;

wherein, the step S52 further comprises the steps of S521-S522:

S521: calculating a covariance matrix of the horizontal acceleration matrix according to the formula (3):

$$C=E\{(X-E[X])(X-E[X])^T\}; \quad \text{Formula (3)}$$

where X denotes the horizontal acceleration matrix, and C denotes the covariance matrix;

S522: calculating an eigenvector $v$ of the covariance matrix C and a corresponding eigenvalue $\lambda$ according to the formula (4):

$$Cv=\lambda v \quad \text{Formula (4)}$$

wherein the eigenvector $v_{max}$ corresponding to the maximum eigenvalue $\lambda_{max}$ is the first principal component eigenvector.

Figure 7:
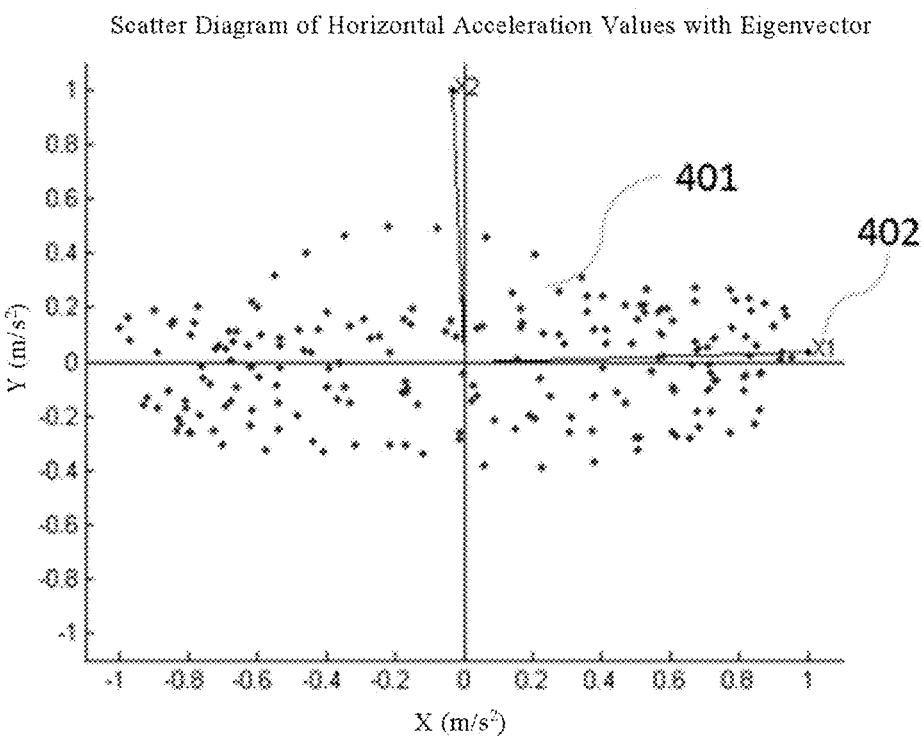
FIG. 7 is a scatter diagram in the horizontal plane of the filtered X-axis acceleration sequence and Y-axis acceleration sequence according to embodiment 1 of the present invention.

As shown in FIG. 7, a scatter diagram in the horizontal plane of the filtered X-axis acceleration sequence and Y-axis acceleration sequence according to embodiment 1 of the present invention. In this embodiment, the primary data is acquired by the accelerometer in the process of walking towards the west. A set of two-dimensional scatter of points 401 formed by the filtered horizontal acceleration sequences are distributed around the X-axis. Applying the Component Analysis on the filtered horizontal acceleration sequences to get the first principal component eigenvector 402 pointing the direction having a greatest variance in the original array.

S53: getting a horizontal acceleration sequence by implementing dimension reduction of the horizontal acceleration matrix on the first principal component vector;

specifically, multiplying the first principal component vector $v_{max}$ by the horizontal acceleration matrix X to get the dimension-reduced horizontal acceleration sequence $ACC_H$.

S54: calibrating the first principal component vector according to the phase difference between the horizontal acceleration sequence and the filtered Z-axis acceleration sequence to obtain the moving direction of the smart device.

Figure 8:
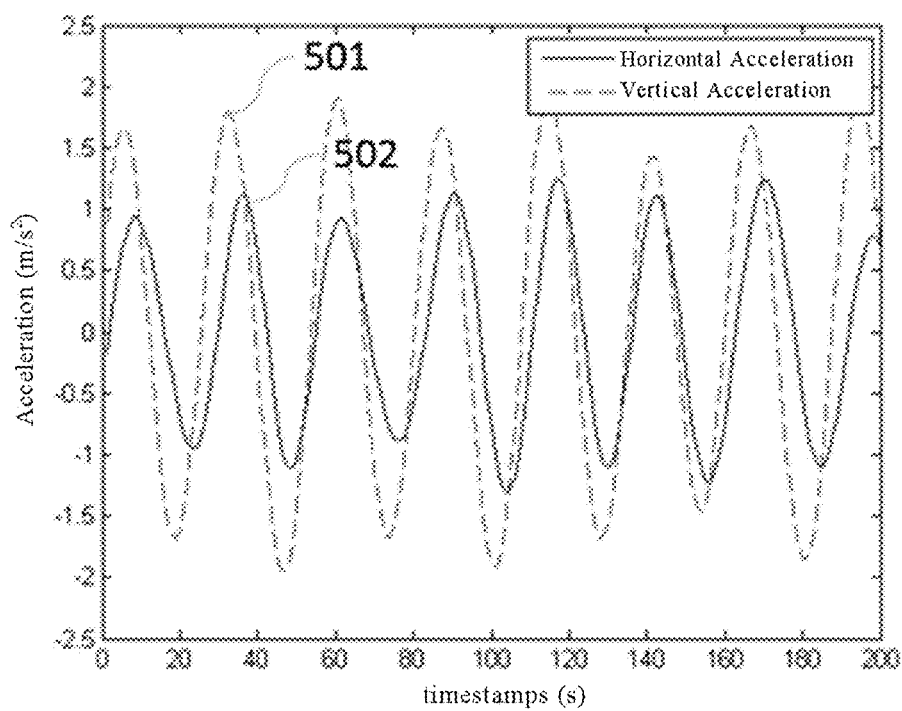
FIG. 8 is a time domain waveform comparison diagram of the horizontal acceleration sequences and the filtered Z-axis acceleration sequence according to embodiment 1 of the present invention.

FIG. 8 is a time domain waveform comparison diagram of the horizontal acceleration sequences and the filtered Z-axis acceleration sequence (i.e. the vertical acceleration sequence) in this embodiment. In FIG. 8, the horizontal acceleration sequences 501 and the vertical acceleration sequence 502 have an identical frequency but different phases. Calibrating the direction of the first principal component vector according to the phase difference between the waveforms of said two acceleration sequences so as to determine the moving direction of the smart device. Specifically, comparing the horizontal acceleration sequence $ACC_H$ with the filtered Z-axis acceleration sequence $fACC_z$ (i.e. the vertical acceleration sequence $ACC_V$), if the vertical acceleration sequence $ACC_V$ has a leading-phase compared to the horizontal acceleration sequences, the moving direction of the smart device is the same as the first principal component vector, that is, $v_{move}=v_{max}$; otherwise if the horizontal acceleration sequences have a leading-phase compared to the vertical acceleration sequence $ACC_V$, the moving direction of the smart device is opposite to the first principal component vector, that is, $v_{move}=-v_{max}$.

S6: calculating displacement of the smart device in the present time period according to formula (1), determining the current position of the smart device by combining the displacement and a previous position recorded in last time period, and recording the current position:

$$S=N*d*V_{move}; \quad \text{Formula (1)}$$

Where S denotes the displacement of the smart device in the present time period, N denotes the step number of user in the present time period, $V_{move}$ denotes the moving direction of the smart device of in the present time period, and d denotes the average step length of the user.

Calculating the displacement in the present time period by combining the user's step number N in the present time period acquired in the step S4, and the moving direction of the smart device $V_{move}$ acquired in the step S5, then determining and recording the current position $S_{current}$ of the smart device based on last position $S_{last}$ in last time period. It is assumed that, the average step length of the user is d, then the displacement in this time period is $S=N\cdot d\cdot V_{move}$, and the current position of the smart device is $S_{current}=S_{last}+S$.

Figure 9:
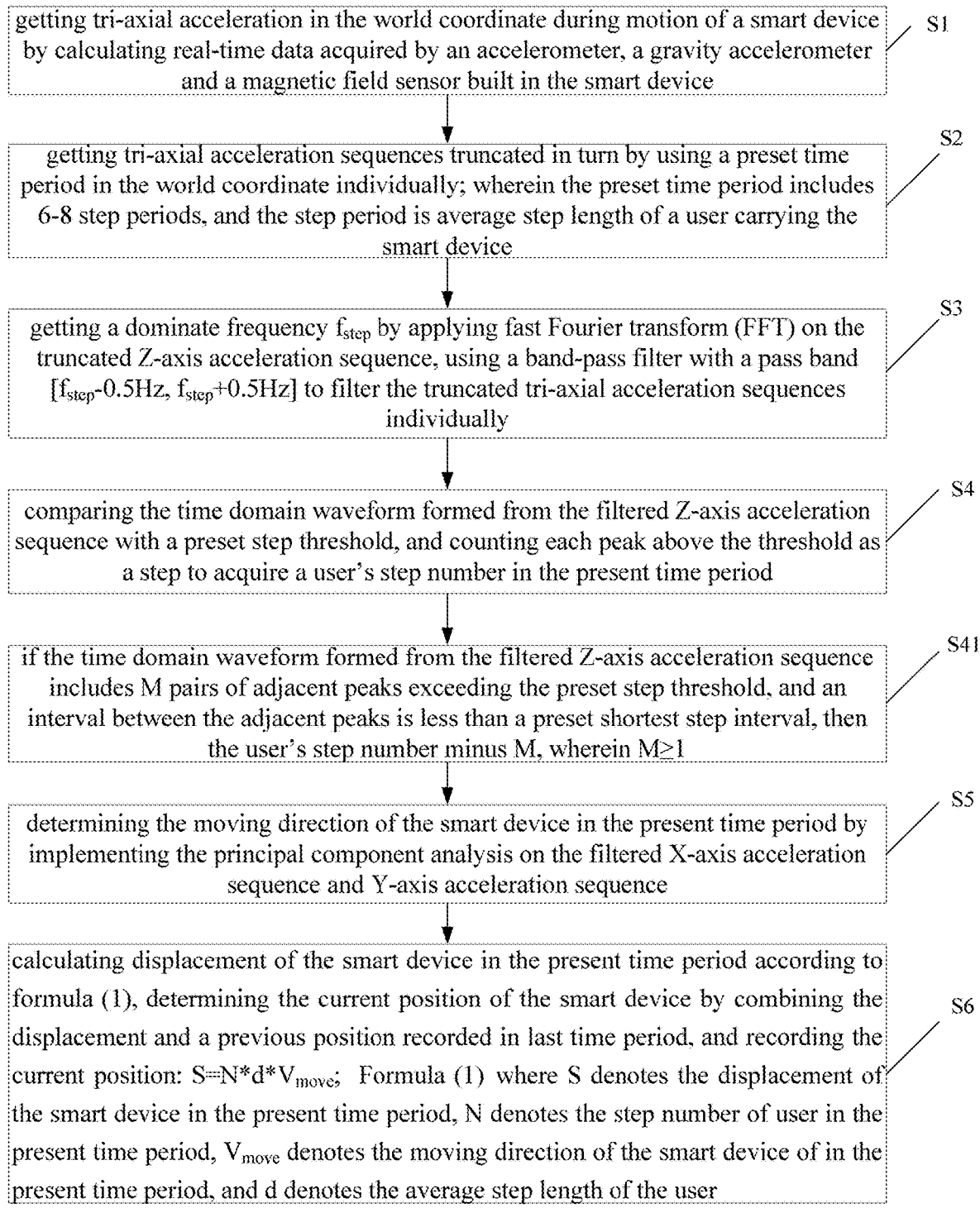
FIG. 9 is a flow diagram of a method of real-time positioning of a smart device according to an embodiment 2 of the present invention.

FIG. 9 is a flow diagram of a method of real-time positioning of a smart device according to an embodiment 2 of the present invention. In this embodiment, on the basis of the embodiment 1, the method further comprises the steps of:

S41: if the time domain waveform form from the filtered Z-axis acceleration sequence includes M pairs of adjacent peaks exceeding the preset step threshold, and an interval between the adjacent peaks is less than a preset shortest step interval, then the user's step number minus M, wherein M≥1.

That is, in the method for real-time positioning of a smart device in this embodiment, the step of correcting the calculated user's step number is additionally provided on the basis of the embodiment 1. Even the acceleration data is filtered with a band-pass filter, the data yet appears irregular waveform, for example, there are two small peaks within one time period. This requires setting a minimum step interval to reduce erroneous judgment, if time interval between the two peaks is less than the minimum step interval, then it is counted as one step. Therefore, in order to avoid the impact of irregular waveform to step counting, this embodiment detects the time interval between each pair of peaks in the time domain waveform formed by the filtered Z-axis acceleration sequence. If said time interval is less than the preset minimum step interval, then the calculated user's step number N will be deducted by M, wherein M≥1, and the corrected user's step number is $N_{correct}=N-M$.

After getting the corrected user's step number $N_{correct}$, calculating the displacement of the smart device for the present time period. That is, plugging $N_{correct}$ into the formula (1) instead of N to compute the displacement S of the smart device in the present time period, which in turn improves the accuracy of calculating.

Figure 10:
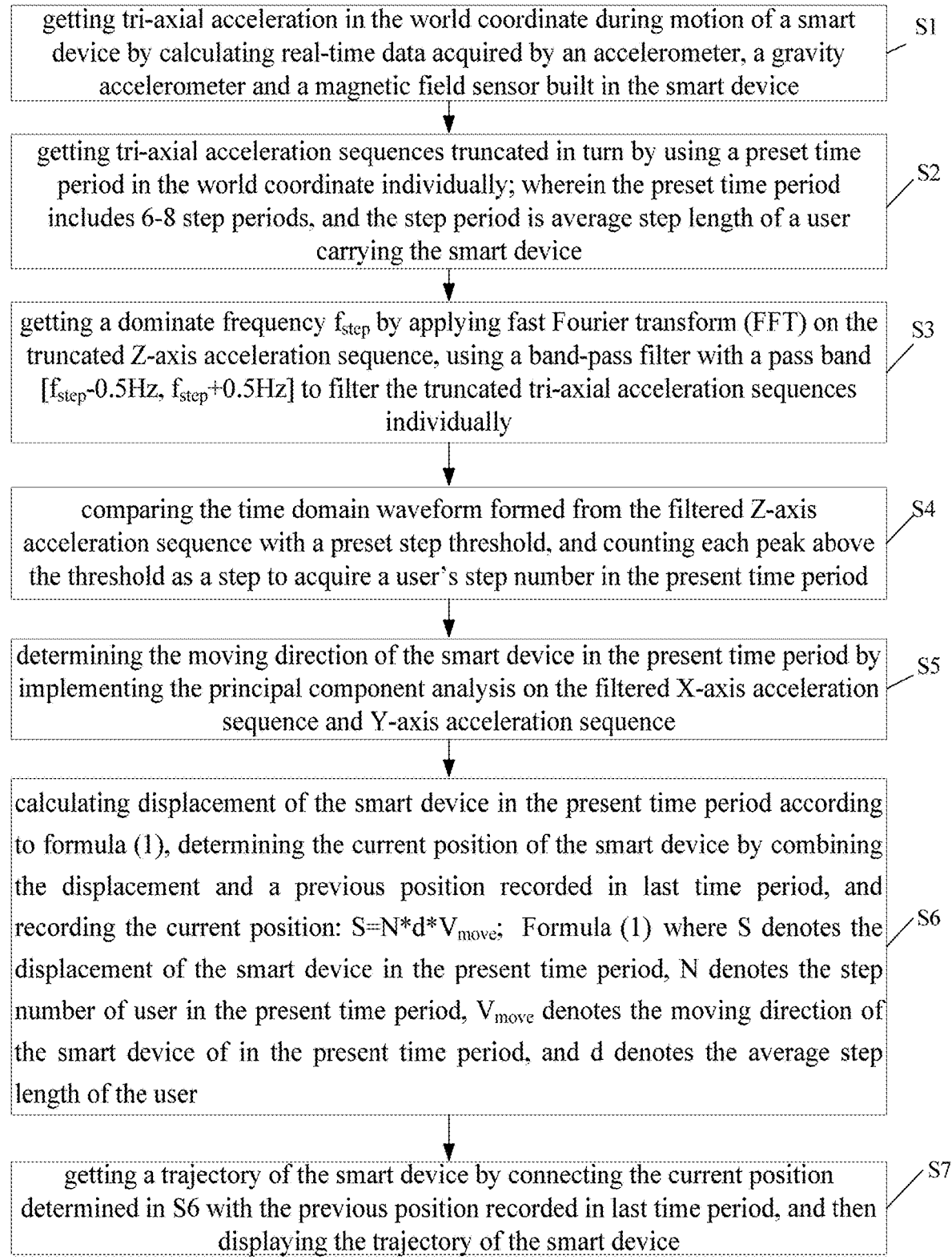
FIG. 10 is a flow diagram of a method of real-time positioning of a smart device according to an embodiment 3 of the present invention.

FIG. 10 is a flow diagram of a method of real-time positioning of a smart device according to an embodiment 3 of the present invention. In this embodiment, on the basis of the embodiment 1, the method further comprises the steps of:

S7: getting a trajectory of the smart device by connecting the current position determined in S6 with the previous position recorded in last time period, and then displaying the trajectory of the smart device.

In this embodiment, besides real-time positioning of the smart device, it is also possible to display the trajectory of the smart device to users. Specifically, the position in each time period can be obtained in turn via the step S6, and the trajectory can be then obtained by connecting the position for the present time period with the position recorded in last time period, and eventually displayed to users.

Figure 11:
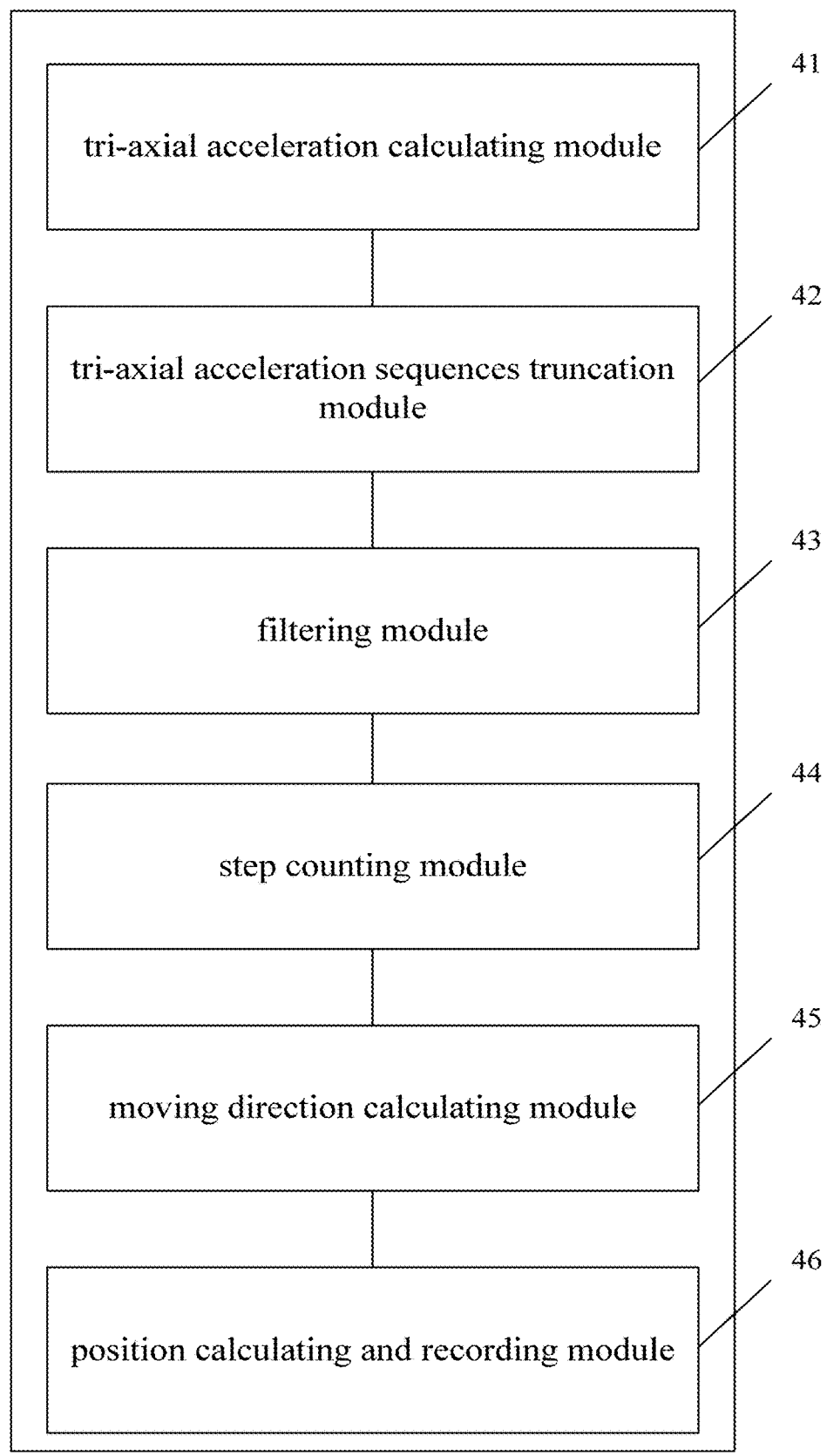
FIG. 11 is a structural block diagram of a system for real-time positioning of a smart device according to embodiment 4 of the present invention.

FIG. 11 is a structural block diagram of a system for real-time positioning of a smart device according to embodiment 4 of the present invention. The system comprises the modules 41-46:

a tri-axial acceleration calculating module 41, configured for getting tri-axial acceleration in the world coordinate during motion of a smart device by calculating real-time data acquired by an accelerometer, a gravity accelerometer and a magnetic field sensor built in the smart device;

a tri-axial acceleration sequences truncation module 42, configured for getting tri-axial acceleration sequences truncated in turn by using a preset time period in the world coordinate individually; wherein the preset time period includes 6-8 step periods, and the step period is average step length of a user carrying the smart device;

specifically, the time period (i.e. the sliding window) in the present invention is set to 4 seconds. If the acquiring frequency of the accelerometer in the present invention is 50 Hz, then the length L of the sliding window should be 200.

a filtering module 43, configured for getting a dominate frequency $f_{step}$ by applying fast Fourier transform (FFT) on the truncated Z-axis acceleration sequence, using a band-pass filter with a pass band [$f_{step}$−0.5 Hz, $f_{step}$+0.5 Hz] to filter the truncated tri-axial acceleration sequences individually;

a step counting module 44, configured for comparing the time domain waveform form from the filtered Z-axis acceleration sequence with a preset step threshold, and counting each peak above the threshold as a step to acquire a user's step number in the present time period;

a moving direction calculating module 45, configured for determining the moving direction of the smart device in the present time period by implementing the Principal Component Analysis on the filtered X-axis acceleration sequence and Y-axis acceleration sequence;

a position calculating and recording module 46, configured for calculating displacement of the smart device in the present time period according to formula (1), determining the current position of the smart device by combining the displacement and a previous position recorded in last time period, and recording the current position:

$$S=N*d*V_{move};\qquad\text{Formula (1)}$$

where S denotes the displacement of the smart device in the present time period, N denotes the step number of user in the present time period, $V_{move}$ denotes the moving direction of the smart device of in the present time period, and d denotes the average step length of the user.

Figure 12:
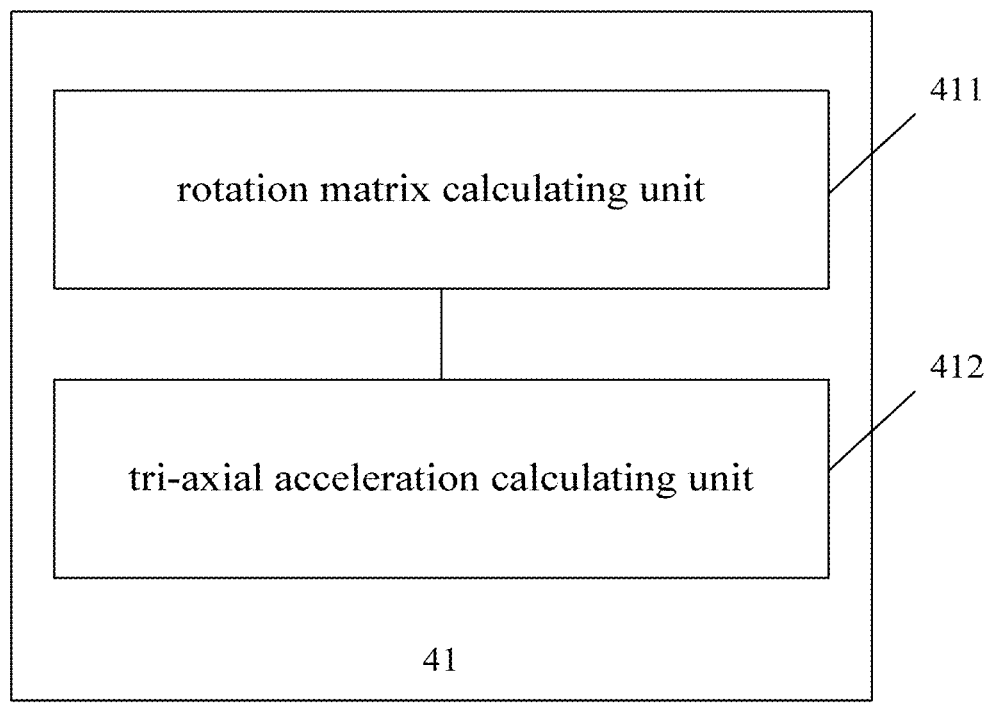
FIG. 12 is a structural block diagram of a tri-axial acceleration calculating module in FIG. 11.

Specifically, FIG. 12 is structural block diagram of a tri-axial acceleration calculating module in FIG. 11. The tri-axial acceleration calculating module 41 further comprises units 411-412:

a rotation matrix calculating unit 411, configured for getting a rotation matrix from the device coordinate to the world coordinate according to the real-time data in the device coordinate acquired by the gravity accelerometer and the magnetic field sensor;

a tri-axial acceleration calculating unit 412, configured for multiplying the tri-axial acceleration in the device coordinate acquired by the accelerometer in real time by the rotation matrix to get the tri-axial acceleration in the world coordinate.

Figure 13:
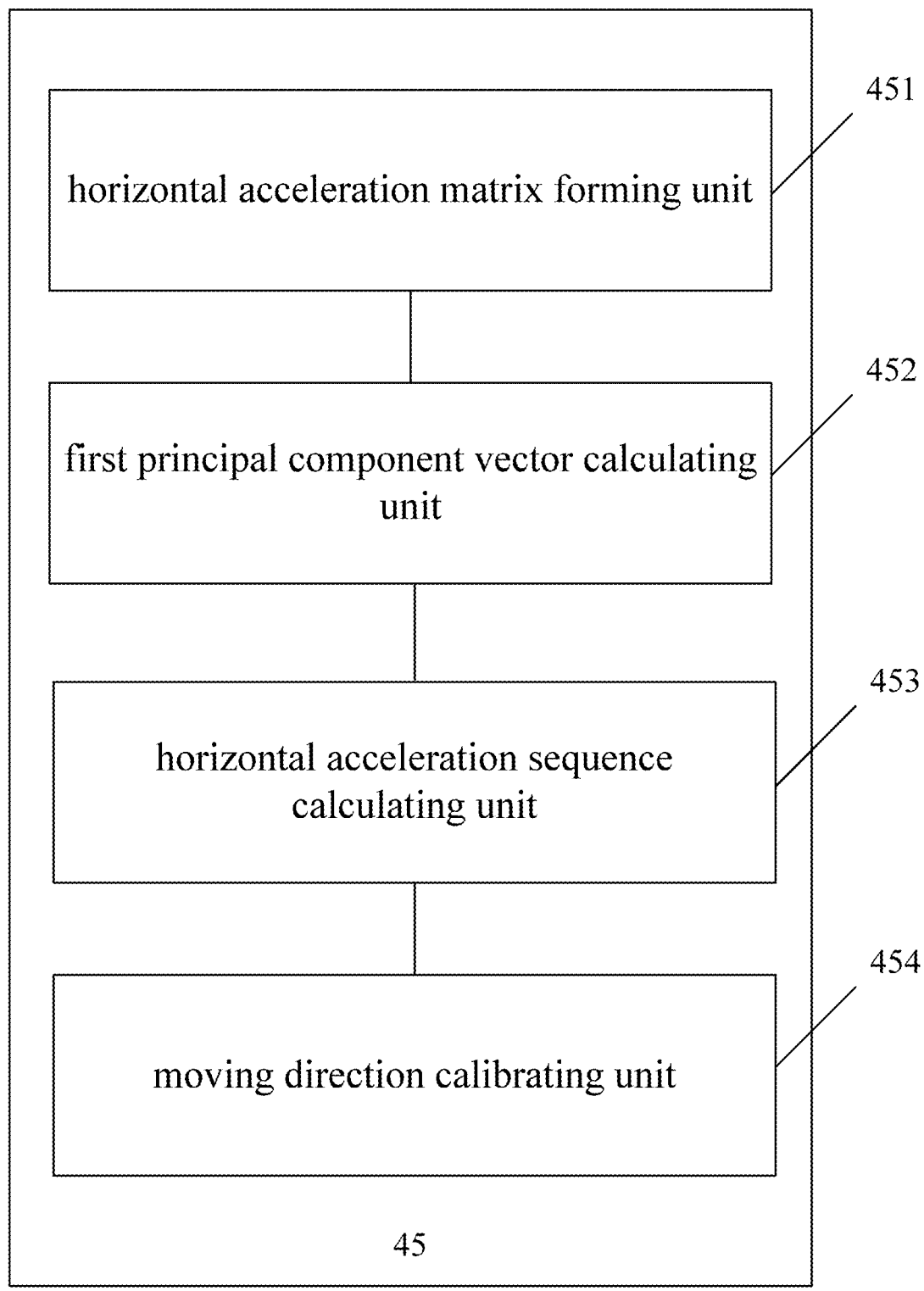
FIG. 13 is a structural block diagram of a moving direction calculating module in FIG. 11.

Specifically, FIG. 13 is a structural block diagram of a moving direction calculating module in FIG. 11. The moving direction calculating module 45 further comprises units 451-454:

a horizontal acceleration matrix forming unit 451, configured for combining the X-axis acceleration sequence and Y-axis acceleration sequence to form a horizontal acceleration matrix;

a first principal component vector calculating unit 452, configured for obtaining a first principal component vector of the horizontal acceleration matrix by implementing Principal Component Analysis;

a horizontal acceleration sequence calculating unit 453, configured for getting a horizontal acceleration sequence by implementing dimension reduction of the horizontal acceleration matrix on the first principal component vector;

specifically, multiplying the horizontal acceleration matrix by the first principal component eigenvector to get the dimension reduced horizontal acceleration sequence.

A moving direction calibrating unit 454, configured for calibrating the first principal component vector according to the phase difference between the horizontal acceleration sequence and the filtered Z-axis acceleration sequence to obtain the moving direction of the smart device.

Specifically, comparing the horizontal acceleration sequence with the filtered Z-axis acceleration sequence, if the filtered Z-axis acceleration sequence has a leading-phase compared to the horizontal acceleration sequence, the moving direction of the smart device is the same as the first principal component vector; otherwise, if the horizontal acceleration sequence has a leading-phase compared to the filtered Z-axis acceleration sequence, the moving direction of the smart device is opposite to the first principal component vector.

Specifically, the first principal component vector calculating unit 452 comprises:

a covariance matrix calculating unit, configured for calculating a covariance matrix of the horizontal acceleration matrix according to the formula (3):

$$C=E\{(X-E[X])(X-E[X])^T\};\qquad\text{Formula (3)}$$

where X denotes the horizontal acceleration matrix, and C denotes the covariance matrix;

an eigenvector calculating unit, configured for calculating an eigenvector v of the covariance matrix C and a corresponding eigenvalue according to the formula (4):

$$Cv=\lambda v \quad \text{Formula (4)}$$

wherein the eigenvector corresponding to the maximum eigenvalue is the first principal component eigenvector.

The operational principle and process of the real-time positioning system of a smart device in this embodiment may refer to the embodiment 1, and it will not be described in detail hereinafter any more.

Figure 14:
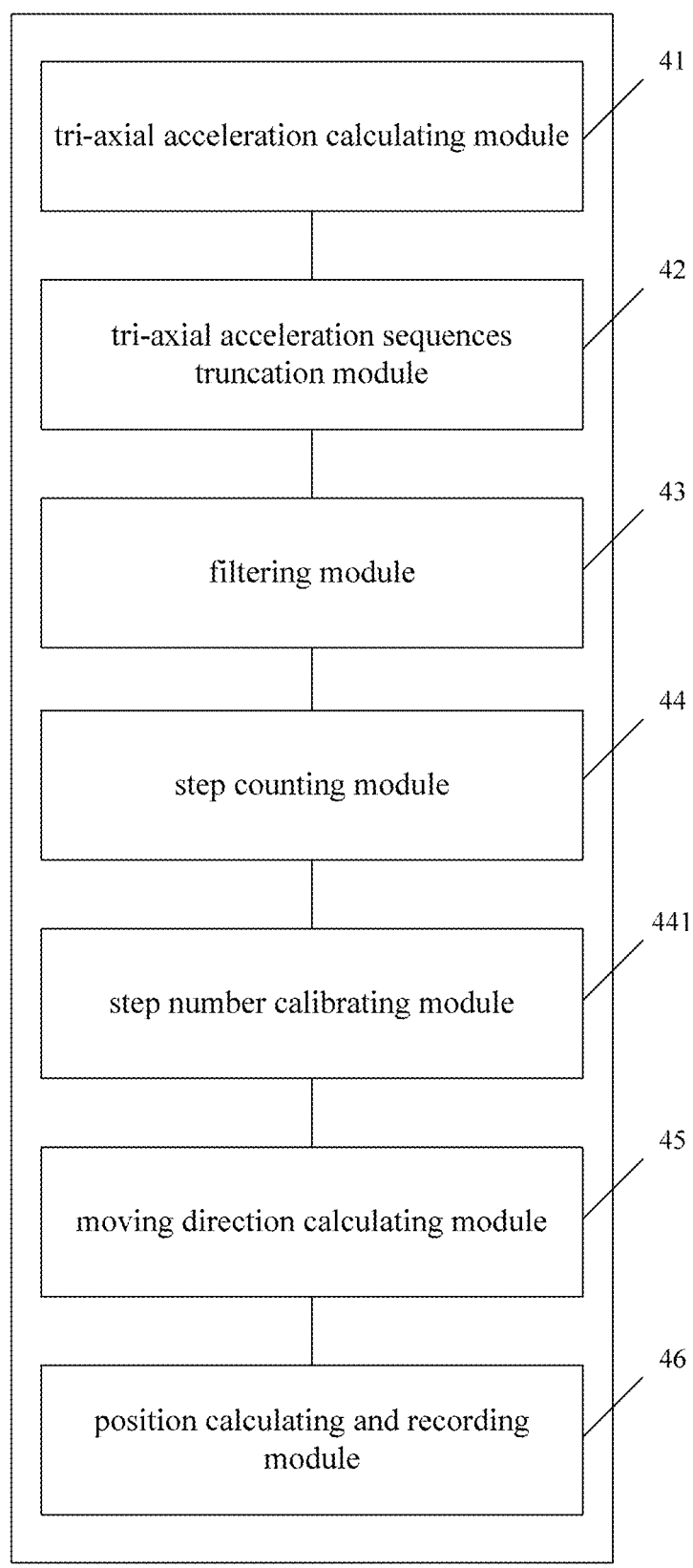
FIG. 14 is a structural block diagram of a system for real-time positioning of a smart device according to embodiment 5 of the present invention.

FIG. 14 is a structural block diagram of a system for real-time positioning of a smart device according to an embodiment 5 of the present invention. The system, on the basis of the embodiment 4, further comprises:

a step number calibrating module 441, configured for implementing the following step: when the time domain waveform form from the filtered Z-axis acceleration sequence includes M pairs of adjacent peaks exceeding the preset step threshold, and an interval between the adjacent peaks is less than a preset shortest step interval, then the user's step number minus M, wherein M≥1.

The operational principle and process of the real-time positioning system of a smart device in this embodiment may refer to the embodiment 2, and it will not be described in detail hereinafter any more.

Figure 15:
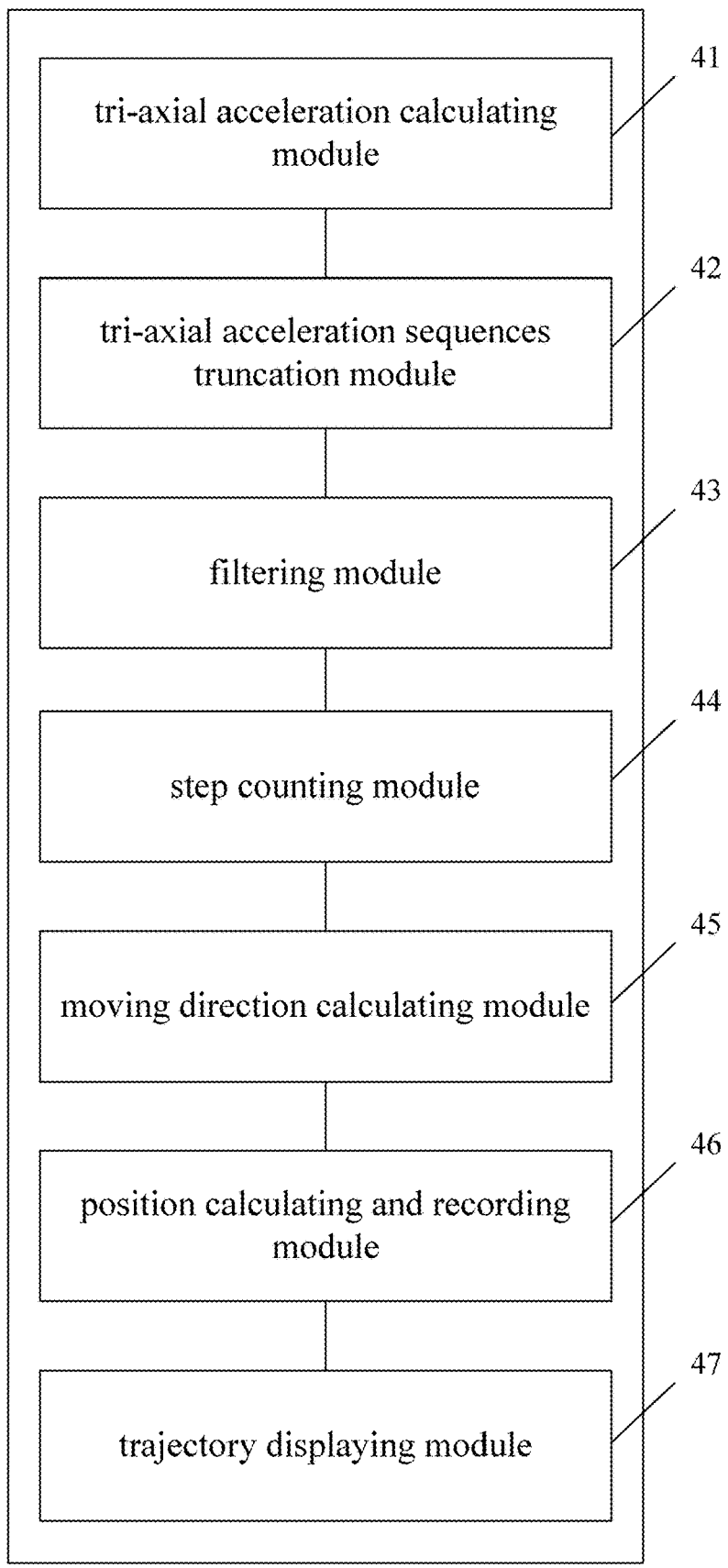
FIG. 15 is a structural block diagram of a system for real-time positioning of a smart device according to embodiment 6 of the present invention.

FIG. 15 is a structural block diagram of a system for real-time positioning of a smart device according to an embodiment 6 of the present invention. The system, on the basis of the embodiment 4, further comprises:

a trajectory displaying module 47, configured for getting a trajectory of the smart device by connecting the current position determined by the position calculating and recording module with the previous position recorded in last time period, and then display.

The operational principle and process of the real-time positioning system of a smart device in this embodiment may refer to the embodiment 3, and it will not be described in detail hereinafter any more.

In conclusion, the method and system for real-time positioning of a smart device of the present invention truncates the tri-axial acceleration in the world coordinate for the preset time period (sliding window), which tri-axial acceleration is real-time acquired and calculated by the accelerometer, the gravity accelerometer and the magnetic field sensor in turn, and thus get tri-axial acceleration sequences truncated for the preset time period. Then a dominate frequency $f_{step}$ is obtained by applying fast Fourier transform (FFT) on the truncated Z-axis acceleration sequence, and the truncated tri-axial acceleration sequences are filtered by using a band-pass filter with a pass band [$f_{step}$−0.5 Hz, $f_{step}$+0.5 Hz] individually. Each peak in the time domain waveform, greater than the preset step threshold, is determined as one step, wherein the time domain waveform is formed by the filtered Z-axis acceleration sequence, and thus the user's step number for the present time period is obtained. The moving direction of the smart device in the present time period is determined by implementing the Principal Component Analysis (PCA) on the filtered X-axis acceleration sequence and Y-axis acceleration sequence, and the displacement and the current position of the smart device for the time period is determined by combined calculation of the user's step number and the moving direction of the smart device. In the present invention, the preset time period (sliding window) includes 6-8 step periods, and the preset time period ensures the accuracy of the determination of the dominate frequency of the Z-axis acceleration sequence by applying fast Fourier transform (FFT) in subsequent steps, as well as the real-time capability of the step counting. Further, the present invention adopts a band-pass filter with a pass band [$f_{step}$−0.5 Hz, $f_{step}$+0.5 Hz], instead of a band-pass filter with a fixed pass band, to filter the tri-axial acceleration sequences for the time period individually, wherein the pass band [$f_{step}$−0.5 Hz, $f_{step}$+0.5 Hz] is designed according to the dominate frequency $f_{step}$ obtained by applying fast Fourier transform (FFT) to the Z-axis acceleration sequence for the time period (because the maximum amplitude of the acceleration data appears on the Z axis). Therefore, the pass band of the band-pass filter adopted by the present invention may carry out automatic regulation according to the acquired Z-axis acceleration data, it is more effective to filter the interference data compared with the existing band-pass filter with a fixed pass band. Furthermore, in order to exclude the erroneous determinations induced by fluctuations and peaks/troughs therebetween of the acceleration data caused by slight waggle of the smart device in other states than walking, the present invention further incorporates a factor of step threshold, that is, each peak in the time domain waveform, greater than the preset step threshold, is determined as one step, wherein the time domain waveform is formed by the filtered Z-axis acceleration sequence, and thus the accuracy of user's step counting is improved, so is the accuracy of real-time positioning of the smart device.

The present invention provides a method for determining the motion gesture of a mobile phone, comprising:

S1: getting tri-axial acceleration in the world coordinate during motion of a mobile phone by calculating real-time data acquired by an accelerometer, a gravity accelerometer and a magnetic field sensor;

S2: using a band-pass filter to filter the real-time tri-axial acceleration, processing the acceleration in the horizontal direction and vertical direction individually, and then getting the walk direction vector of the mobile phone and counting step number;

S3: calculating a heading direction vector of the current step, and implementing dimension reduction of the horizontal acceleration on the direction vector;

S4: after calibrating the heading direction vector of the current step, calculating the current position of the mobile phone by combining the step number counting.

Preferably, the step S1 further comprises:

S11: calculating a rotation matrix from the mobile phone coordinate to the world coordinate according to the real-time data in the mobile phone coordinate acquired by the gravity accelerometer and the magnetic field sensor;

S12: multiplying the tri-axial acceleration in the mobile phone coordinate acquired by the accelerometer in real time by the rotation matrix to get the tri-axial acceleration in the world coordinate during the motion of the mobile phone.

Preferably, the step S2 comprises:

S21: using a band-pass filter with a pass band of 1-3 Hz to filter the tri-axial acceleration;

S22: implementing the Principal Component Analysis on the horizontal acceleration for the preset sliding window to get a walk direction vector of the mobile phone;

S23: counting step number according to the periodicity of the acceleration data in the vertical direction;

the preset sliding window is a time window having a duration of a time period of one step.

Preferably, the step S22 comprises:

after forming the horizontal acceleration matrix from the X-axis acceleration data and Y-axis acceleration data in a horizontal plane for the preset sliding window, calculating a covariance matrix of the above matrix, and thereby the eigenvector of the covariance matrix and the corresponding eigenvalue, and eventually the eigenvector corresponding to the maximum eigenvalue of the covariance matrix, which eigenvector acts as the walk direction vector of the mobile phone at present.

Preferably, the step S3 comprises:

S31: calculating a mean value of the walk direction vector in a step period as the heading direction vector of the current step;

S32: implementing dimension reduction of the horizontal acceleration on the heading direction vector.

Preferably, in the step S3, the step of implementing dimension reduction of the horizontal acceleration on the heading direction vector of the current step, further comprises:

forming a sampling matrix by the X-axis acceleration data and Y-axis acceleration data in a horizontal plane for the step period, and then multiplying the sampling matrix by the heading direction vector to get a product which acts as a dimension-reduced horizontal acceleration.

Preferably, the step S4 comprises:

S41: calculating a phase difference between the vertical acceleration and the dimension-reduced horizontal acceleration, and calibrating the heading direction vector of the current step according to the phase difference, so as to get the walk heading direction vector of the mobile phone;

S42: combining the walk heading direction vector and the step counting, so as to determine the current position of the mobile phone.

Preferably, the step S41 further comprises:

calculating a phase difference between the vertical acceleration and the dimension-reduced horizontal acceleration, and calibrating the heading direction vector of the current step according to the phase difference, if the phase of the vertical acceleration is ahead of the phase of the dimension-reduced horizontal acceleration, the heading direction vector acts as the walk heading direction vector, otherwise the inverse heading direction vector acts as the walk heading direction vector.

The step S42 further comprises:

combining the walk heading direction vector and the step counting, so as to determine the current position of the mobile phone according to the following formula:

$$\begin{cases} s_{current} = s_{initial} + \sum_{i=0}^{N} s_i \\ s_i = L_i \cdot v_{gi} \end{cases}$$

where $s_{current}$ denotes the current position of the mobile phone, $s_{initial}$ denotes the initial position of the mobile phone, N denotes the number of step counting, i denotes a natural number, $s_i$ denotes the displacement of the mobile phone during step i, $L_i$ denotes the length of the step i, $v_{gi}$ denotes the walk heading direction vector of the step i.

Preferably, the rotation matrix in the step S11 is:

$$R = \begin{bmatrix} \cos\gamma\cdot\cos\varphi - \sin\gamma\cdot\sin\theta\cdot\sin\varphi & \cos\gamma\cdot\sin\theta + \sin\gamma\cdot\sin\theta\cdot\cos\varphi & -\sin\gamma\cdot\cos\theta \\ -\cos\theta\cdot\sin\varphi & \cos\theta\cdot\cos\varphi & \sin\theta \\ \sin\gamma\cdot\cos\varphi + \cos\gamma\cdot\sin\theta\cdot\sin\varphi & \sin\gamma\cdot\sin\varphi - \cos\gamma\cdot\sin\theta\cdot\cos\varphi & \cos\gamma\cdot\cos\theta \end{bmatrix}$$

where R denotes the rotation matrix, $\varphi$, $\theta$, $\gamma$ denote azimuth, pitch and roll respectively. And they should match the following formula:

$$\begin{cases} \theta = \sin^{-1}\frac{G_y}{g} \\ \gamma = \tan^{-1}\left(-\frac{G_x}{G_z}\right) \\ \varphi = \tan^{-1}\frac{\cos\gamma\cdot B_x + \sin\gamma\cdot B_y}{\sin\theta\cdot\sin\gamma\cdot B_x + \cos\theta\cdot B_y - \sin\theta\cdot\cos\gamma\cdot B_z} \end{cases}$$

where g denotes the gravitational acceleration, $G_x$、$G_y$, $G_z$ respectively denote the tri-axial real-time data in the mobile phone coordinate acquired by the gravity accelerometer while $B_x$, $B_y$, $B_z$ respectively denote the tri-axial real-time data in the mobile phone coordinate acquired by the magnetic sensor.

Hereinafter the present invention will be described in detail accompanied with a specific embodiment.

A method for determining the motion gesture of a mobile phone, comprises:

S1: getting tri-axial acceleration in the world coordinate during motion of a mobile phone by calculating real-time data acquired by an accelerometer, a gravity accelerometer and a magnetic field sensor built in the mobile phone, specifically comprising the steps of S11-S12:

S11: calculating a rotation matrix from the mobile phone coordinate to the world coordinate according to the real-time data in the mobile phone coordinate acquired by the gravity accelerometer and the magnetic field sensor;

in this step, the axes $X_W$, $Y_W$, $Z_W$ in the world coordinate respectively point to the east, north and the top, the axes $X_P$, $Y_P$, $Z_P$ in the mobile phone coordinate respectively point to the right along the screen, the top along the screen, and perpendicularly outwards from the screen, $\varphi$, $\theta$ and $\gamma$ denote azimuth, pitch and roll respectively, and the rotation matrix from the world coordinate to the mobile phone coordinate is:

$$R = \begin{bmatrix} \cos\gamma\cdot\cos\varphi - \sin\gamma\cdot\sin\theta\cdot\sin\varphi & \cos\gamma\cdot\sin\theta + \sin\gamma\cdot\sin\theta\cdot\cos\varphi & -\sin\gamma\cdot\cos\theta \\ -\cos\theta\cdot\sin\varphi & \cos\theta\cdot\cos\varphi & \sin\theta \\ \sin\gamma\cdot\cos\varphi + \cos\gamma\cdot\sin\theta\cdot\sin\varphi & \sin\gamma\cdot\sin\varphi - \cos\gamma\cdot\sin\theta\cdot\cos\varphi & \cos\gamma\cdot\cos\theta \end{bmatrix}$$

Because in the world coordinate, the theoretical value of the gravitational acceleration is $[0\ 0\ g]^T$, the real-time tri-axial data in the mobile phone coordinate acquired by the gravity accelerometer is $[G_x, G_y, G_x]^T$, and it can be obtained that $$\begin{bmatrix} G_x \\ G_y \\ G_z \end{bmatrix} = R \begin{bmatrix} 0 \\ 0 \\ g \end{bmatrix},$$

the real-time tri-axial data in the mobile phone coordinate acquired by the magnetic field sensor is $[B_x\ B_y\ B_z]^T$, then it is projected to the horizontal plane, and the magnetic flux at the $X_W$, $Y_W$ axis are $$\begin{bmatrix} \cos\gamma \cdot B_x + \sin\gamma \cdot B_y \\ \sin\theta \cdot \sin\gamma \cdot B_x + \cos\theta \cdot B_y - \sin\theta \cdot \cos\gamma \cdot B_z \end{bmatrix}.$$

Based on the above formulas, $\varphi$, $\theta$, $\gamma$ should match the following formula:

$$\begin{cases} \theta = \sin^{-1}\dfrac{G_y}{g} \\ \gamma = \tan^{-1}\left(-\dfrac{G_x}{G_z}\right) \\ \varphi = \tan^{-1}\dfrac{\cos\gamma \cdot B_x + \sin\gamma \cdot B_y}{\sin\theta \cdot \sin\gamma \cdot B_x + \cos\theta \cdot B_y - \sin\theta \cdot \cos\gamma \cdot B_z} \end{cases}$$

The rotation matrix R can be calculated by plugging the formulas of $\varphi$、$\theta$, $\gamma$ into the formula of the rotation matrix R.

S12: multiplying the real-time tri-axial acceleration acc in the mobile phone coordinate acquired by the accelerometer by the rotation matrix R to get the tri-axial acceleration in the world coordinate, i.e. ACC=R·acc. Wherein, the tri-axial acceleration in the mobile phone coordinate acquired by the accelerometer in real time are $$acc = \begin{bmatrix} acc_x \\ acc_y \\ acc_z \end{bmatrix},$$

the tri-axial acceleration in the world coordinate acquired in real time are $$ACC = \begin{bmatrix} ACC_x \\ ACC_y \\ ACC_z \end{bmatrix},$$

where $ACC_x$, $ACC_y$ indicate horizontal acceleration, while $ACC_z$ indicates vertical acceleration.

S2: using a band-pass filter to filter the real-time tri-axial acceleration, processing the acceleration in the horizontal direction and vertical direction individually, and then getting the walk direction vector of the mobile phone and counting step number, specifically comprising the steps of S21-S23:

S21: using a band-pass filter with a pass band of 1-3 Hz to filter the tri-axial acceleration $ACC_x$, $ACC_y$ and $ACC_z$, to get the filtered tri-axial acceleration in the world coordinate, recorded as $fACC_x$, $fACC_y$ and $fACC_z$;

S22: implementing the Principal Component Analysis on the horizontal acceleration for the preset sliding window to get a walk direction vector of the mobile phone, specifically, forming a N*2 horizontal acceleration matrix by the X-axis acceleration data $fACC_x$ and Y-axis acceleration data $fACC_y$ in a horizontal plane for the preset sliding window, where N denotes sample number in the preset sliding window, determined by the step period and the acceleration sampling frequency. Then calculating the covariance matrix C of the horizontal acceleration matrix X according to the formula $C=E\{(X-E[X])(X-E[X])^T\}$, and thereby calculating an eigenvector $v$ of the covariance matrix C and a corresponding eigenvalue $\lambda$ according to the formula $Cv=\lambda v$, and eventually getting the eigenvector $v_{max}$ corresponding to the maximum eigenvalue $\lambda_{max}$ in the covariance matrix C, which eigenvector $v_{max}$ acts as the walk direction vector of the mobile phone;

S23: periodically counting step number according to the acceleration data $fACC_z$ in the vertical direction. Specifically, the waveform of the filtered vertical acceleration $fACC_z$ is in the form of sinusoid wave. The peak, which is counted as one step, can be obtained from the sloping variation tendency of the waveform, and thus the time interval between every two adjacent peaks may be marked as one step period;

the preset sliding window is a time window having a duration of a time period of one step.

S3: calculating a heading direction vector of the current step, and implementing dimension reduction of the horizontal acceleration on the direction vector, specifically comprising the steps of S31-S32:

S31: calculating a mean value of the walk direction vector in a step period as the heading direction vector of the current step;

S32: implementing dimension reduction of the horizontal acceleration on the heading direction vector.

In this step, the step of implementing dimension reduction of the horizontal acceleration on the heading direction vector of the current step, further comprises:

forming a M*2 sampling matrix P by the X-axis acceleration data $fACC_x$ and Y-axis acceleration data $fACC_y$ in a horizontal plane for the step period, where M denotes sample number acquired in that period, and then multiplying the sampling matrix P by the heading direction vector to get a product which acts as a dimension-reduced horizontal acceleration $ACC_h$;

S4: after calibrating the heading direction vector of the current step, calculating the current position of the mobile phone by combining the step number counting, the step S4 specifically comprising the steps of S41-S42:

S41: calculating a phase difference between the vertical acceleration $fACC_z$ and the dimension-reduced horizontal acceleration $ACC_h$, and calibrating the heading direction vector of the current step according to the phase difference, if the phase of the vertical acceleration $fACC_z$ is ahead of the phase of the dimension-reduced horizontal acceleration $ACC_h$, the heading direction vector acts as the walk heading direction vector, otherwise the inverse heading direction vector acts as the walk heading direction vector;

S42: combining the walk heading direction vector and the step counting, to determine the current position of the mobile phone according to the following formula:

$$\begin{cases} s_{current} = s_{initial} + \sum_{i=0}^{N} s_i \\ s_i = L_i \cdot v_{gi} \end{cases}$$

Where $s_{current}$ denotes the current position of the mobile phone, $s_{initial}$ denotes the initial position of the mobile phone, N denotes the number of step counting, i denotes a natural number, $s_i$ denotes the displacement of the mobile phone during step i, $L_i$ denotes the length of the step i, $v_{gi}$ denotes the walk heading direction vector of the step i.

This method determines the motion gesture of the mobile phone during user's walk by using an accelerometer, a gravity accelerometer and a magnetic field sensor built in the smart phone, computes the motion gesture of the mobile phone during user's walk by processing and comparing the acceleration data of the mobile phone in the horizontal and vertical direction. This effectively reduces the cumulative error, improves the accuracy and the measurement stability. This method does not require the user to hold the mobile phone in a certain pose, and is well adapted for various users. This method is suitable for the applications such as indoor positioning, pedestrian navigation, etc.

It should be understood that, all/parts of steps in the above-mentioned embodiments may be implemented by related hardware by means of computer program which is stored in a readable storage medium. While running said program, the processes as mentioned in individual embodiments of the method may be included. In the embodiments, said storage medium may comprise a diskette, a disc, a Read-Only Memory ROM, or a Random Access Memory RAM, etc.

All above described are the preferred embodiments of the present invention. It should be noted that, for a skilled person in the art, all kinds of modifications or improvements could be made by following the principle of the present invention. These modifications and improvements are deemed to be included within the scope of the invention.

What is claimed is:

1. A method for real-time positioning of a smart device, comprising the following steps:

S1: getting tri-axial acceleration in the world coordinate during motion of a smart device by calculating real-time data acquired by an accelerometer, a gravity accelerometer and a magnetic field sensor built in the smart device;

S2: getting tri-axial acceleration sequences truncated in turn by using a preset time period in the world coordinate individually; wherein the preset time period includes 6-8 step periods, and the step period is average step length of a user carrying the smart device;

S3: getting a dominant frequency $f_{step}$ by applying fast Fourier transform (FFT) on the truncated Z-axis acceleration sequence, using a band-pass filter with a pass band [$f_{step}$−0.5 Hz, $f_{step}$+0.5 Hz] to filter the truncated tri-axial acceleration sequences individually;

S4: comparing the time domain waveform form from the filtered Z-axis acceleration sequence with a preset step threshold, and counting each peak above the threshold as a step to acquire a user's step number in the present time period;

S5: determining the moving direction of the smart device in the present time period by implementing the Principal Component Analysis on the filtered X-axis acceleration sequence and Y-axis acceleration sequence;

S6: calculating displacement of the smart device in the present time period according to formula (1), determining the current position of the smart device by combining the displacement and a previous position recorded in last time period, and recording the current position:

$$S = N * d * V_{move}, \quad \text{Formula (1)}$$

where S denotes the displacement of the smart device in the present time period, N denotes the step number of user in the present time period, $V_{move}$ denotes the moving direction of the smart device of in the present time period, and d denotes the average step length of the user;

S7: getting a trajectory of the smart device by connecting the current position determined in S6 with the previous position recorded in last time period, and then displaying the trajectory of the smart device.

2. A method for real-time positioning of a smart device according to claim 1, wherein the method further comprises:

S41: if the time domain waveform form from the filtered Z-axis acceleration sequence includes M pairs of adjacent peaks exceeding the preset step threshold, and an interval between the adjacent peaks is less than a preset shortest step interval, then the user's step number minus M, wherein M≥1.

3. A method for real-time positioning of a smart device according to claim 2, wherein the preset shortest step interval is 0.5 second.

4. A method for real-time positioning of a smart device according to claim 1, wherein the preset step threshold is 0.5 m/s².

5. A method for real-time positioning of a smart device according to claim 1, wherein the preset time period is 4 seconds; and/or the sampling frequency of the accelerometer is 50 Hz.

6. A method for real-time positioning of a smart device according to claim 1, wherein the step S1 further comprises:

S11: getting a rotation matrix from the device coordinate to the world coordinate according to the real-time data in the device coordinate acquired by the gravity accelerometer and the magnetic field sensor;

S12: multiplying the tri-axial acceleration in the device coordinate acquired by the accelerometer in real time by the rotation matrix to get the tri-axial acceleration in the world coordinate.

7. A method for real-time positioning of a smart device according to claim 6, wherein the rotation matrix R is as follows:

$$R = \begin{bmatrix} \cos\gamma \cdot \cos\varphi - \sin\gamma \cdot \sin\theta \cdot \sin\varphi & \cos\gamma \cdot \sin\theta + \sin\gamma \cdot \sin\theta \cdot \cos\varphi & -\sin\gamma \cdot \cos\theta \\ -\cos\theta \cdot \sin\varphi & \cos\theta \cdot \cos\varphi & \sin\theta \\ \sin\gamma \cdot \cos\varphi + \cos\gamma \cdot \sin\theta \cdot \sin\varphi & \sin\gamma \cdot \sin\varphi - \cos\gamma \cdot \sin\theta \cdot \cos\varphi & \cos\gamma \cdot \cos\theta \end{bmatrix}$$

where R denotes the rotation matrix; φ, θ and γ denote azimuth, pitch and roll respectively, and the relation thereamong is shown by the following formula (2):

$$\begin{cases} \theta = \sin^{-1} \dfrac{G_y}{g} \\ \gamma = \tan^{-1} \left( -\dfrac{G_x}{G_z} \right) \\ \varphi = \tan^{-1} \dfrac{\cos\gamma \cdot B_x + \sin\gamma \cdot B_y}{\sin\theta \cdot \sin\gamma \cdot B_x + \cos\theta \cdot B_y - \sin\theta \cdot \cos\gamma \cdot B_z} \end{cases} \quad \text{Formula (2)}$$

where $G_x$, $G_y$, $G_z$ respectively denote the tri-axial gravitational acceleration in the device coordinate acquired by the gravity accelerometer in real time while $B_x$, $B_y$, $B_z$ respectively denote the tri-axial magnetic flux in the device coordinate acquired by the magnetic sensor in real time.

8. A method for real-time positioning of a smart device according to claim 1, wherein the step S5 further comprises:

S51: combining the X-axis acceleration sequence and Y-axis acceleration sequence to form a horizontal acceleration matrix;

S52: obtaining a first principal component vector of the horizontal acceleration matrix by implementing Principal Component Analysis;

S53: getting a horizontal acceleration sequence by implementing dimension reduction of the horizontal acceleration matrix on the first principal component vector;

S54: calibrating the first principal component vector according to the phase difference between the horizontal acceleration sequence and the filtered Z-axis acceleration sequence to obtain the moving direction of the smart device.

9. A method for real-time positioning of a smart device according to claim 8, wherein the step S52 further comprises:

S521: calculating a covariance matrix of the horizontal acceleration matrix according to the formula (3):

$$C=E\{(X-E[X])(X-E[X])^T\};\qquad \text{Formula (3)}$$

where X denotes the horizontal acceleration matrix, and C denotes the covariance matrix;

S522: calculating an eigenvector $v$ of the covariance matrix C and a corresponding eigenvalue $\lambda$ according to the formula (4):

$$Cv=2\lambda v \qquad \text{Formula (4)}$$

where the eigenvector corresponding to the maximum eigenvalue is the first principal component eigenvector.

10. A method for real-time positioning of a smart device according to claim 8, wherein the step S53 further comprises:

multiplying the horizontal acceleration matrix by the first principal component eigenvector to get the dimension reduced horizontal acceleration sequence.

11. A method for real-time positioning of a smart device according to claim 8, wherein the step S54 further comprises:

comparing the horizontal acceleration sequence with the filtered Z-axis acceleration sequence, if the filtered Z-axis acceleration sequence has a leading-phase compared to the horizontal acceleration sequence, the moving direction of the smart device is the same as the first principal component vector; otherwise, if the horizontal acceleration sequence has a leading-phase compared to the filtered Z-axis acceleration sequence, the moving direction of the smart device is opposite to the first principal component vector.

* * * * *